Figure 1:
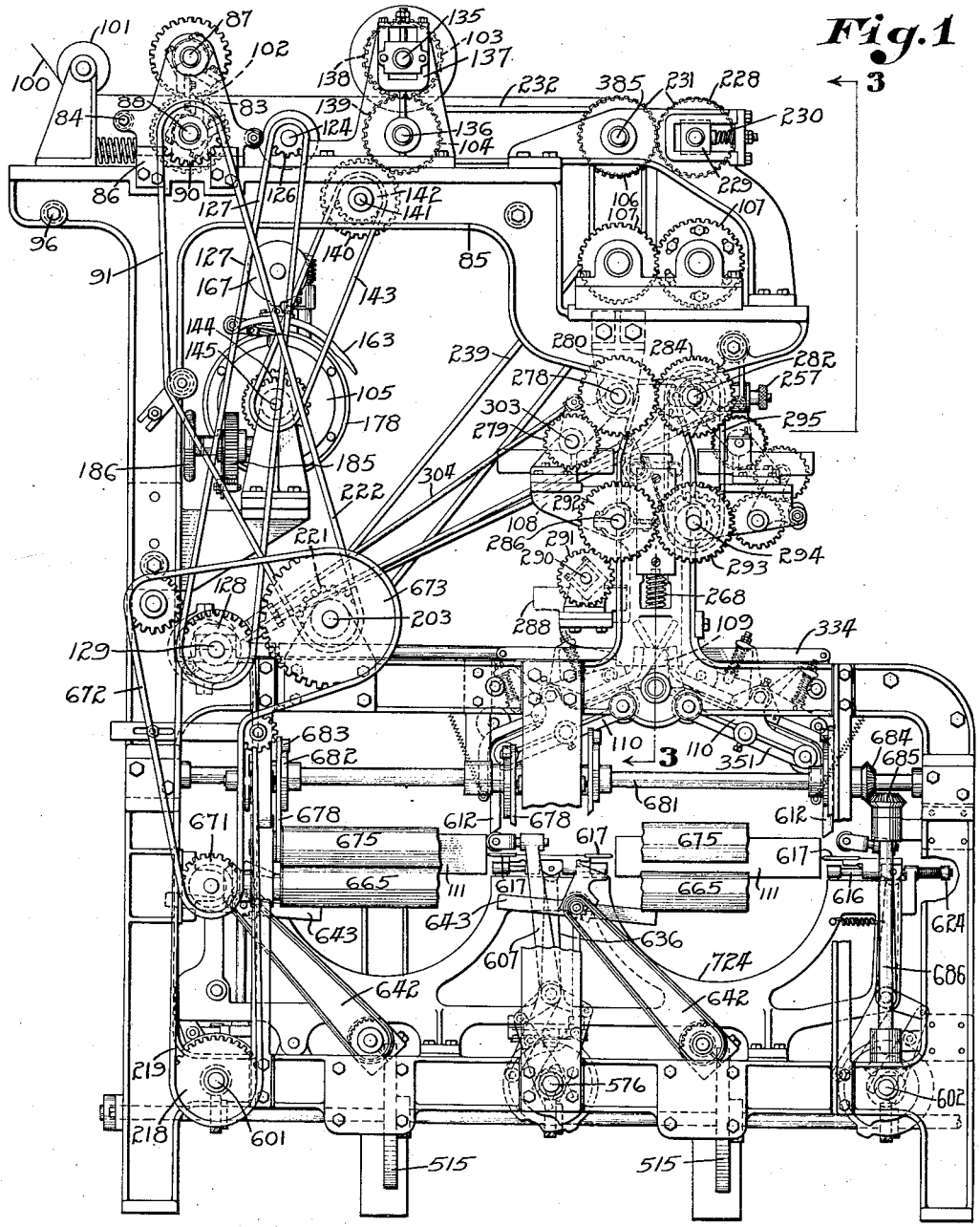

Aug. 27, 1935.  H. R. WILLIAMS  2,012,700

BAG WINDING METHOD AND APPARATUS

Filed July 2, 1931  25 Sheets-Sheet 1

Inventor
Harrison R. Williams
By Owen & Owen
Attorneys

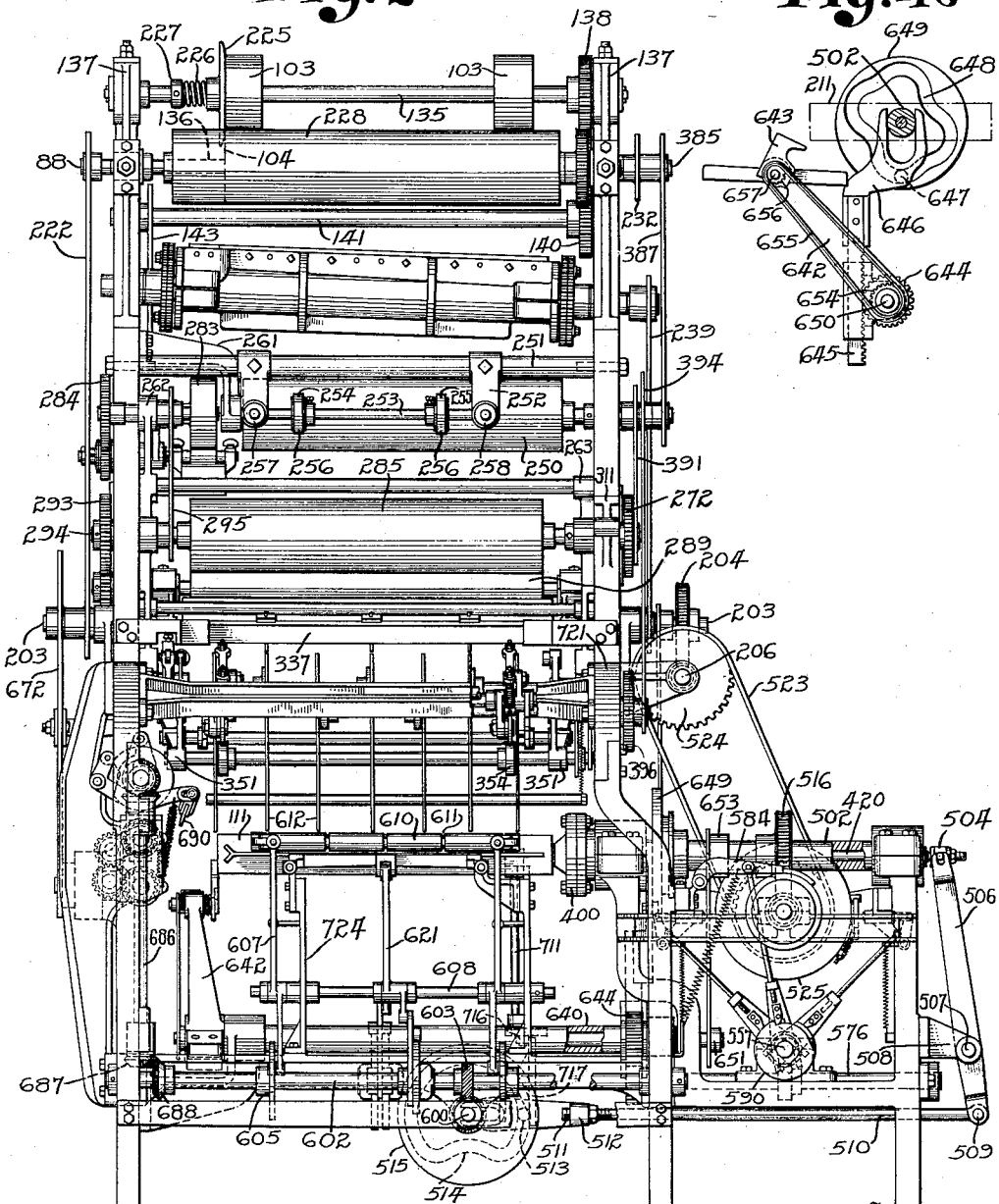

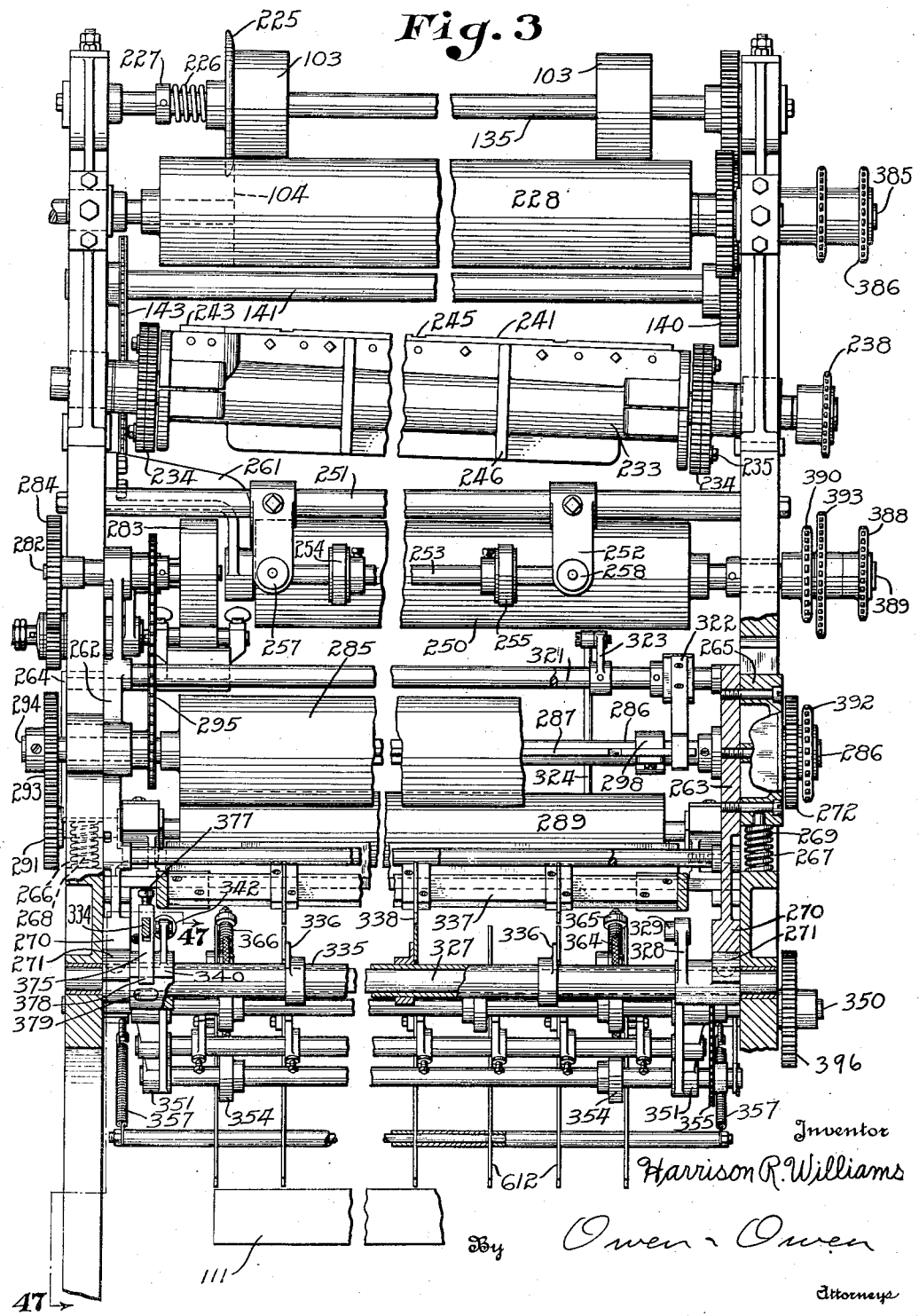

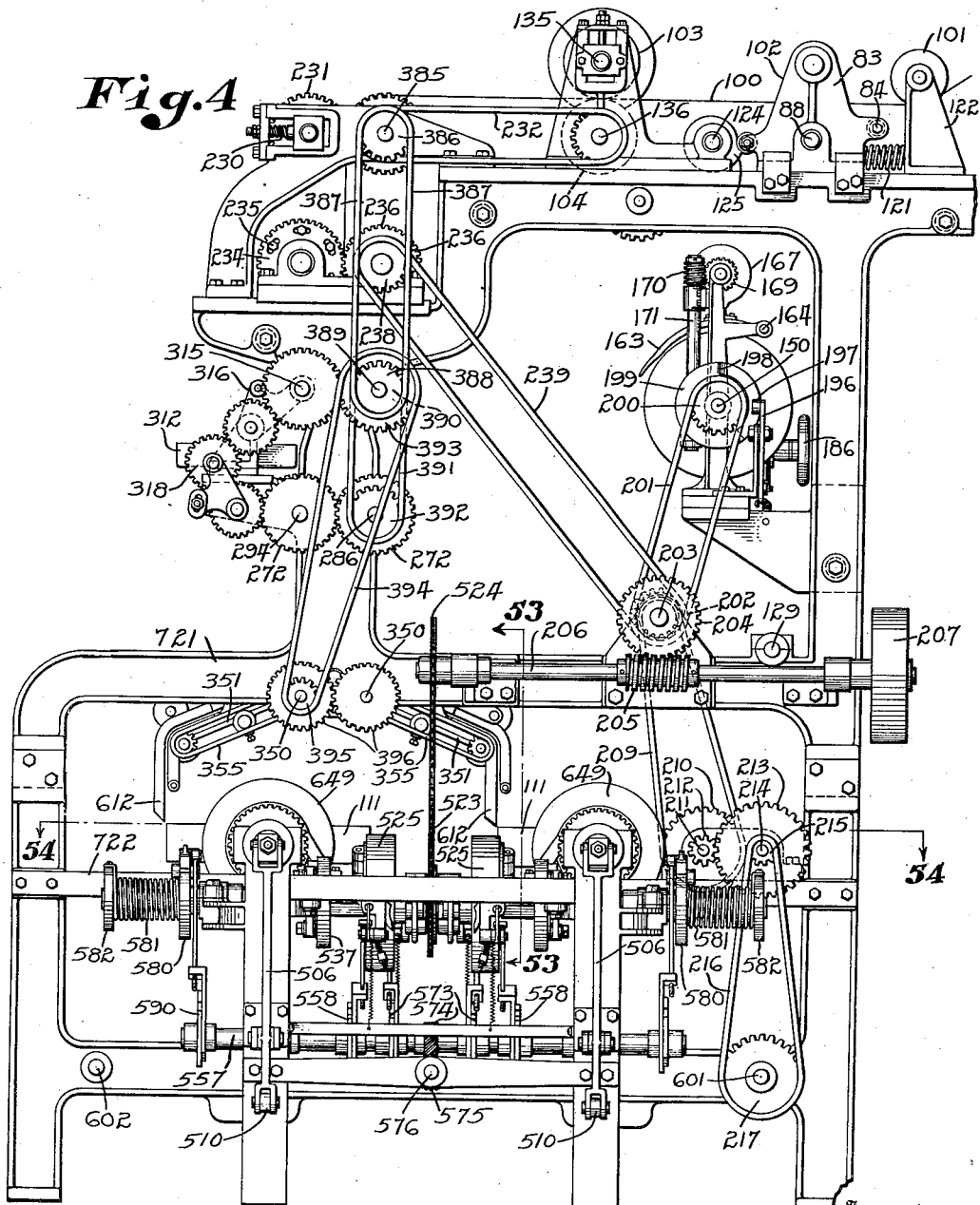

Inventor
Harrison R. Williams
By Owen - Owen
Attorneys

Aug. 27, 1935.    H. R. WILLIAMS    2,012,700
BAG WINDING METHOD AND APPARATUS
Filed July 2, 1931    25 Sheets-Sheet 6

Inventor
Harrison R. Williams
By Owen-Owen
Attorneys

Aug. 27, 1935. H. R. WILLIAMS 2,012,700
BAG WINDING METHOD AND APPARATUS
Filed July 2, 1931 25 Sheets-Sheet 7
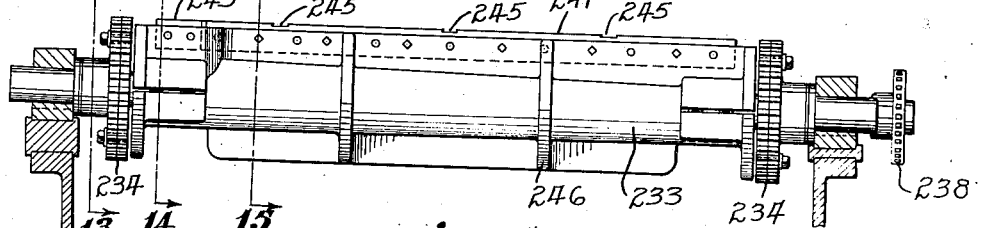
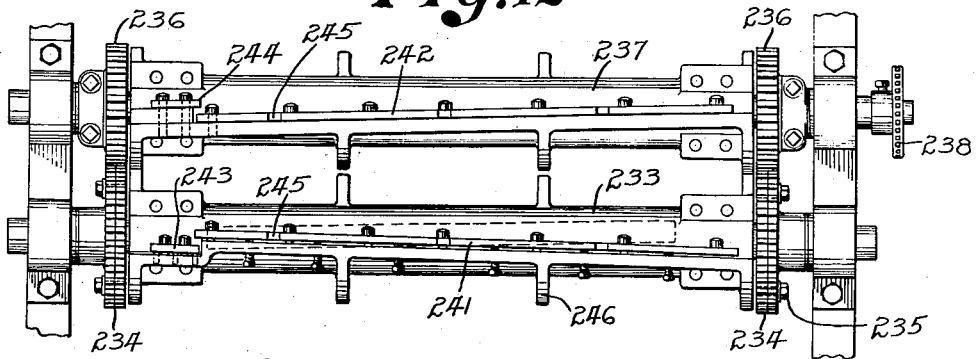
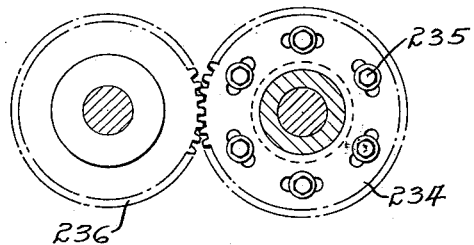
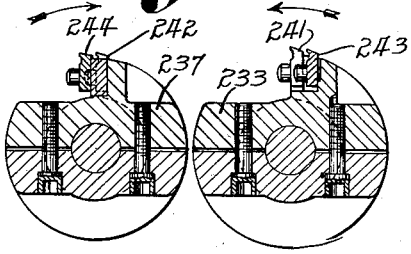
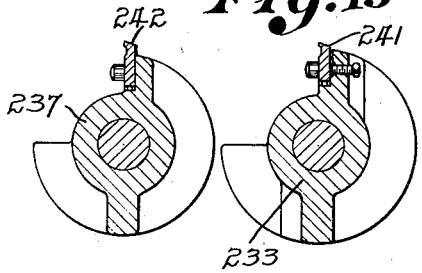
Inventor
Harrison R. Williams
By Owen-Owen
Attorneys Aug. 27, 1935.  H. R. WILLIAMS  2,012,700
BAG WINDING METHOD AND APPARATUS
Filed July 2, 1931   25 Sheets-Sheet 8
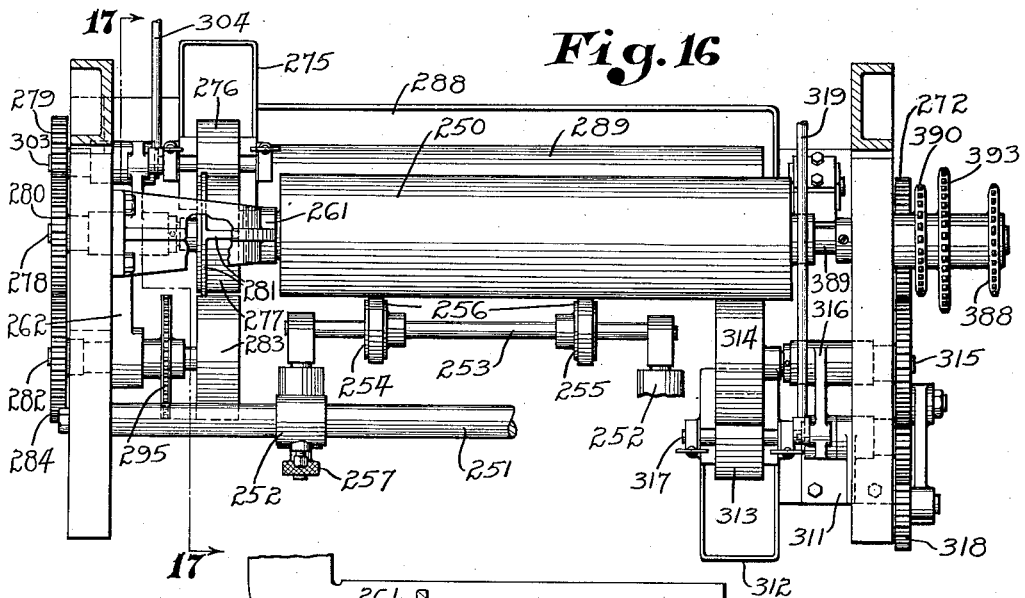
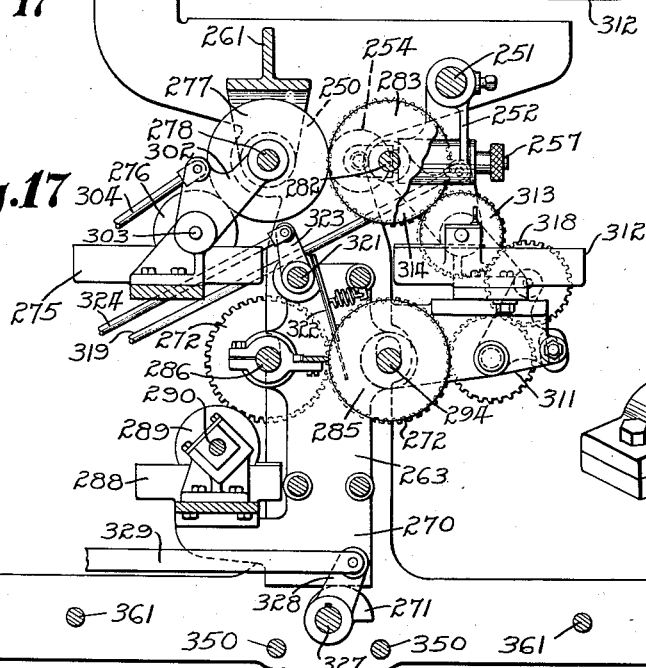
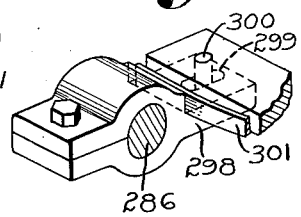
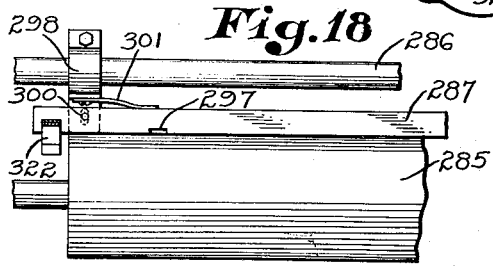
Inventor
Harrison R. Williams
By Owen & Owen
Attorneys

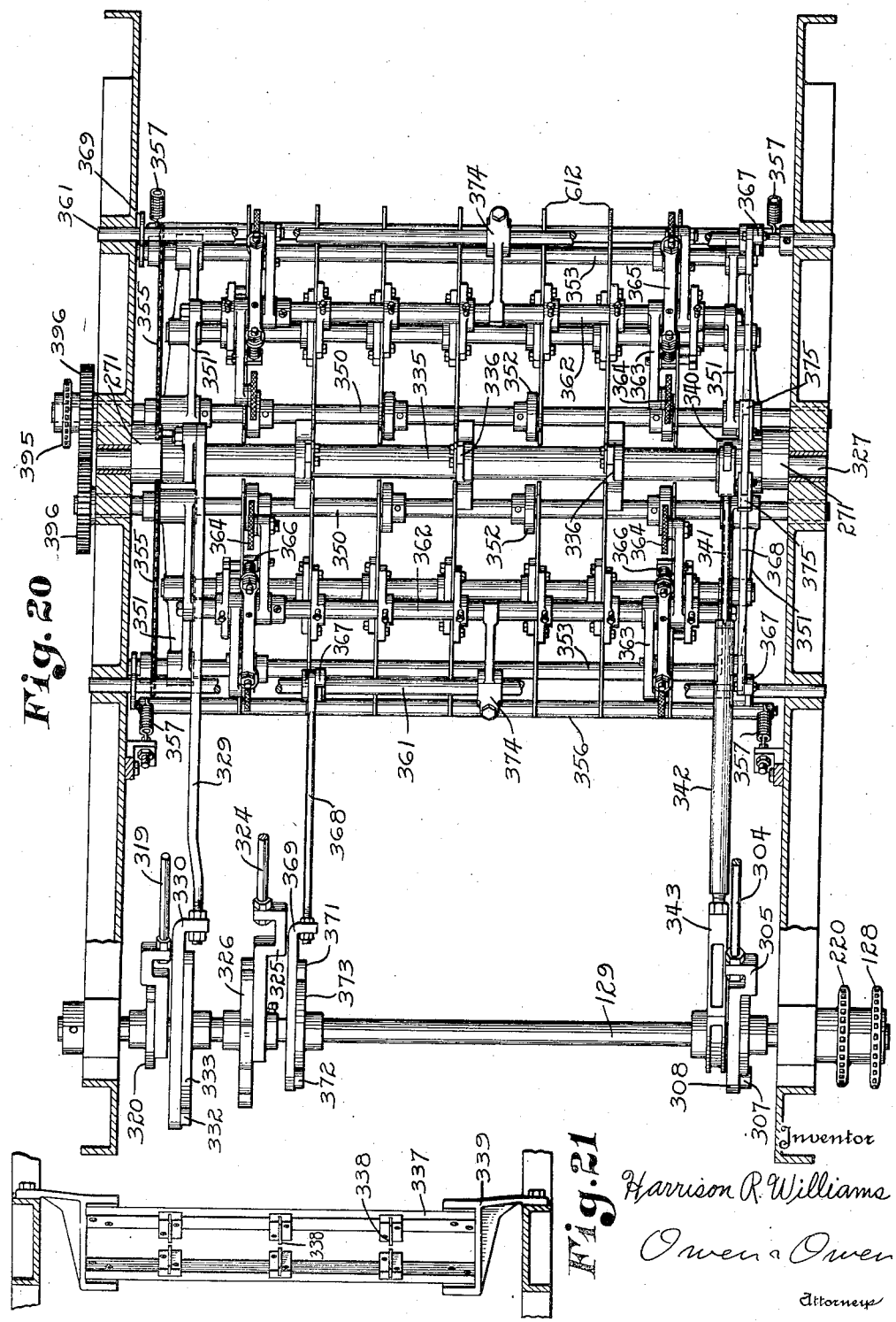

Aug. 27, 1935.  H. R. WILLIAMS  2,012,700
BAG WINDING METHOD AND APPARATUS
Filed July 2, 1931  25 Sheets-Sheet 10
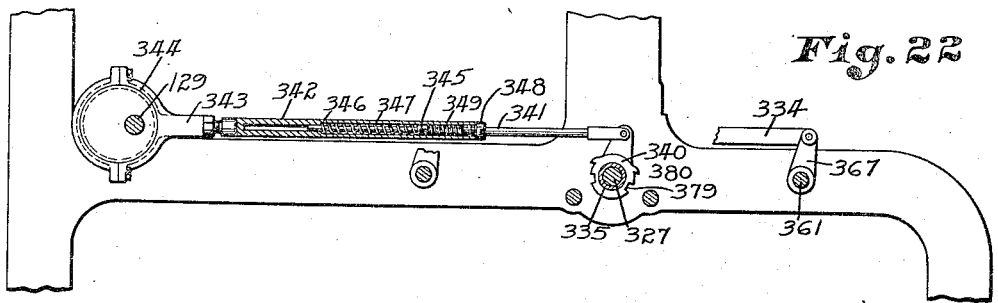
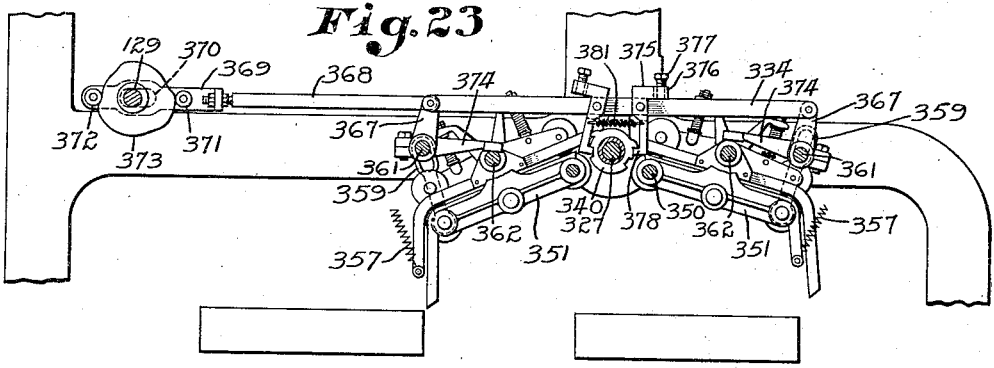
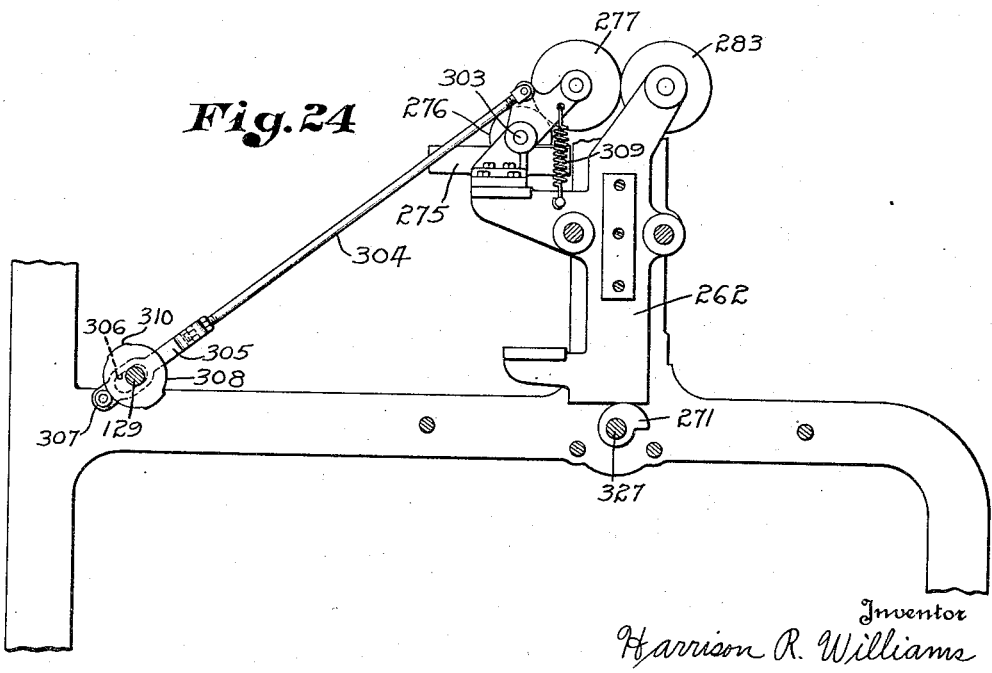
Inventor
Harrison R. Williams
By Owen - Owen
Attorneys

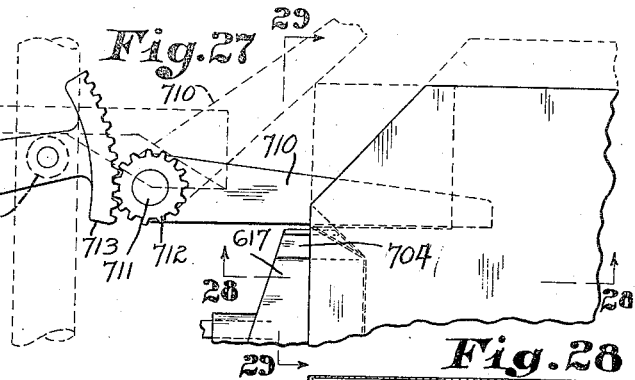

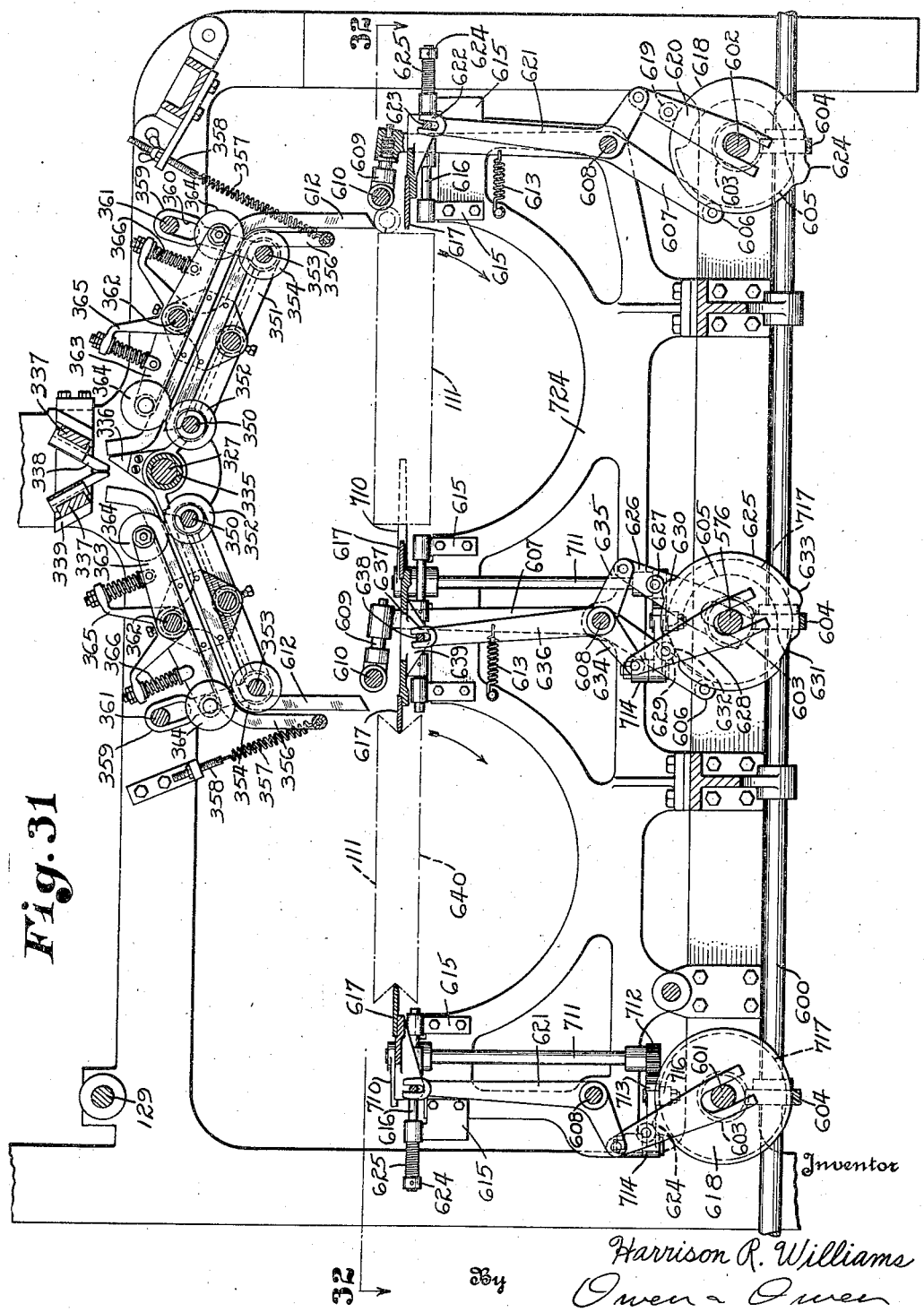

Aug. 27, 1935. H. R. WILLIAMS 2,012,700
BAG WINDING METHOD AND APPARATUS
Filed July 2, 1931 25 Sheets-Sheet 13
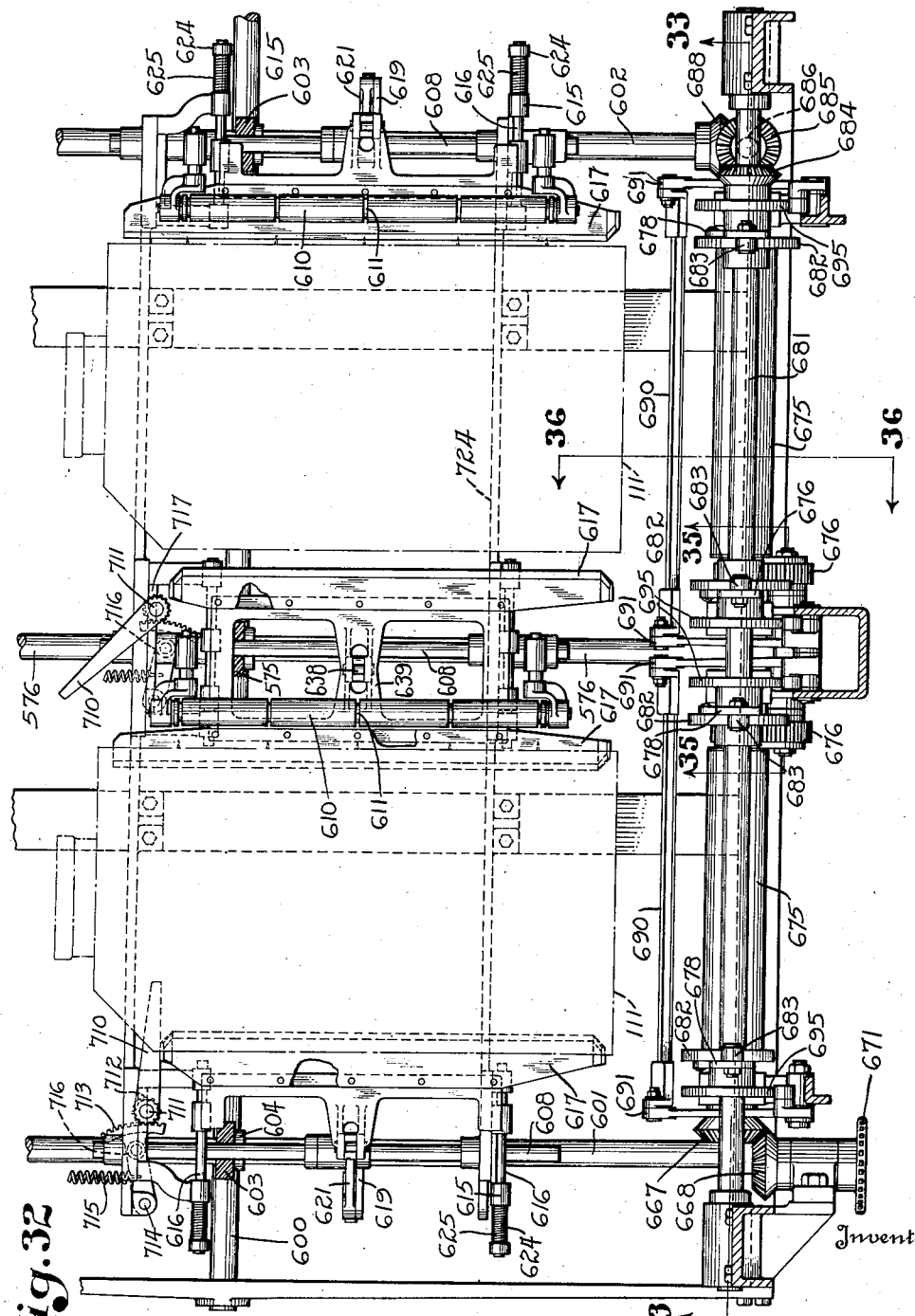
Fig. 32
Inventor
Harrison R. Williams
Owen - Owen
Attorneys Aug. 27, 1935.　　　　H. R. WILLIAMS　　　　2,012,700
BAG WINDING METHOD AND APPARATUS
Filed July 2, 1931　　　25 Sheets-Sheet 14

Inventor
Harrison R. Williams
By Owen & Owen
Attorneys

Aug. 27, 1935.  H. R. WILLIAMS  2,012,700
BAG WINDING METHOD AND APPARATUS
Filed July 2, 1931   25 Sheets-Sheet 15
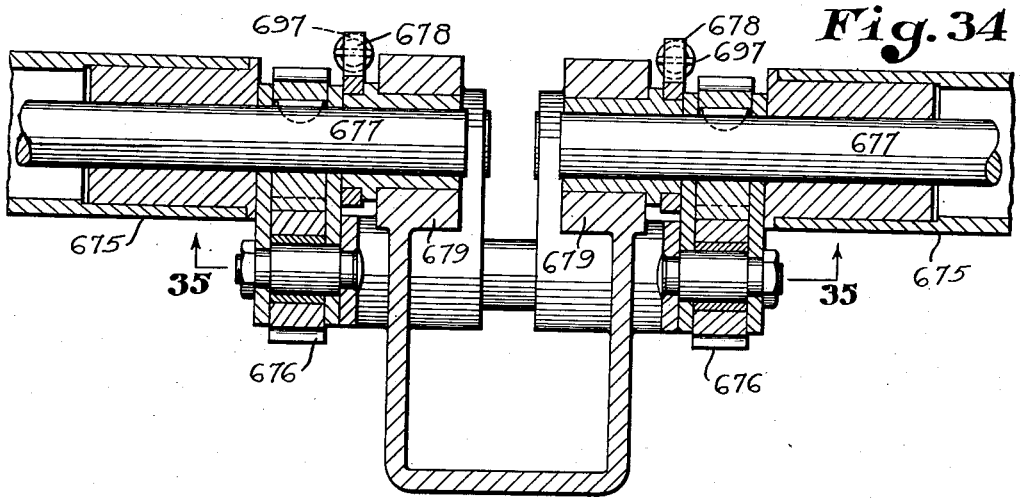
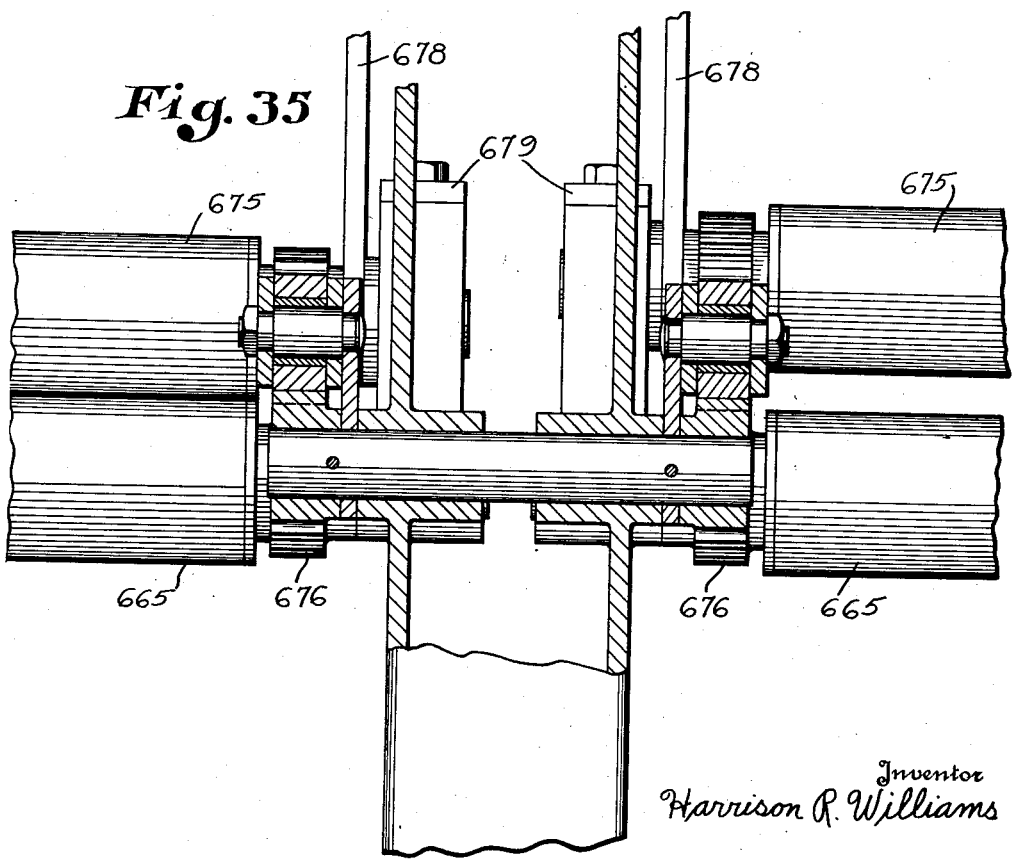
Inventor
Harrison R. Williams
By Owen Owen
Attorneys

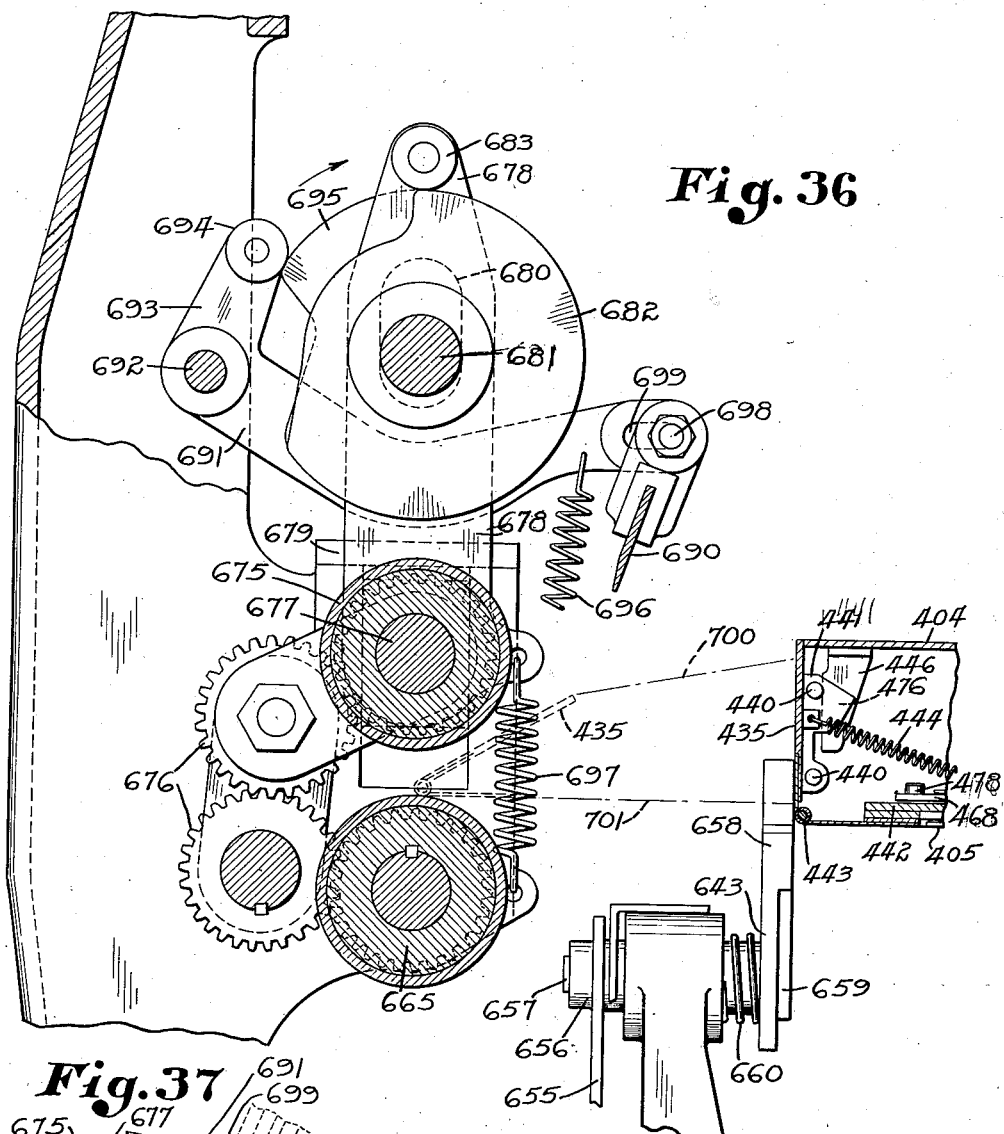
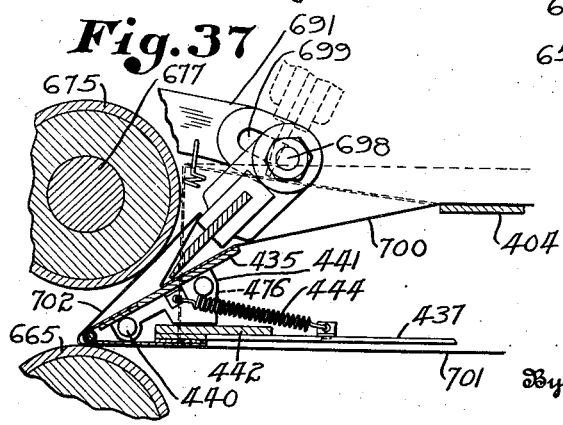

Aug. 27, 1935.  H. R. WILLIAMS  2,012,700
BAG WINDING METHOD AND APPARATUS
Filed July 2, 1931  25 Sheets-Sheet 17
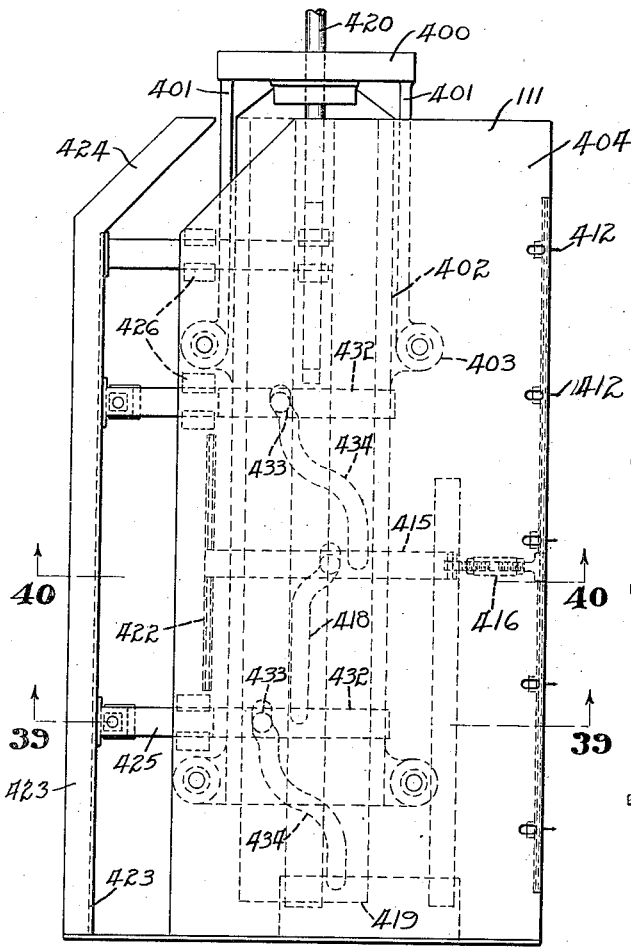
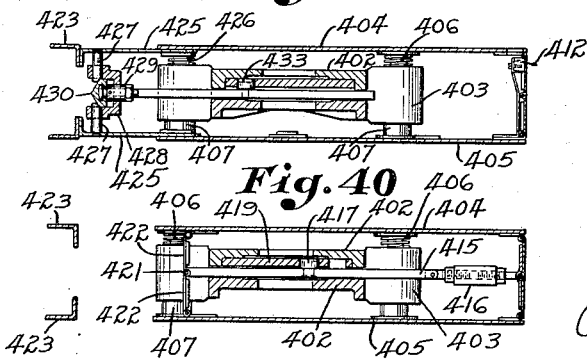
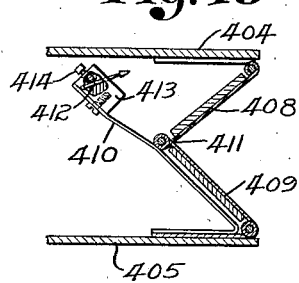
Inventor
Harrison R. Williams
Owen & Owen
Attorneys

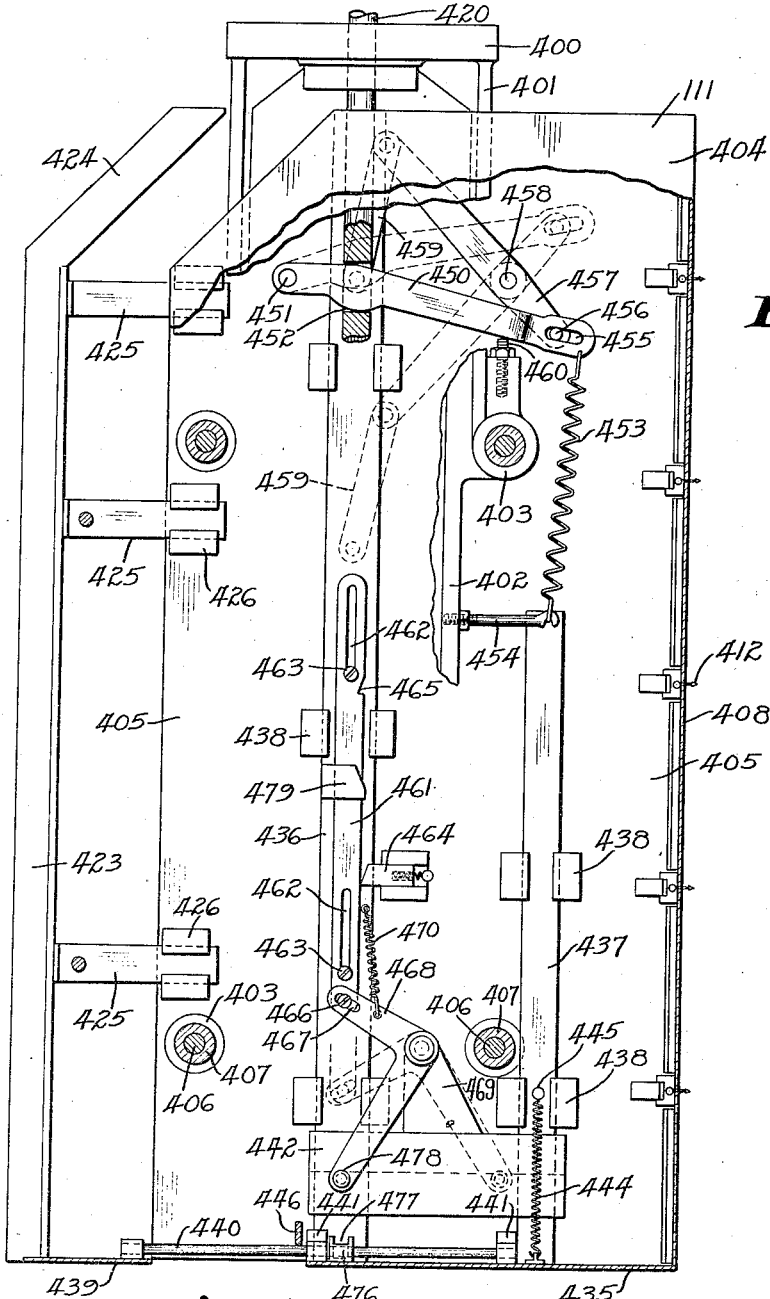

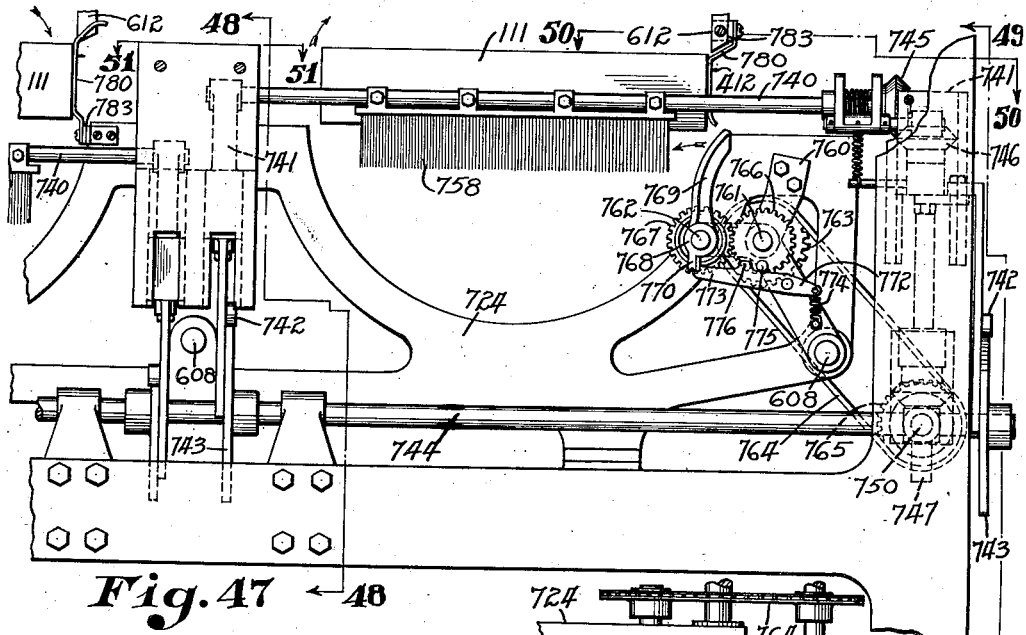
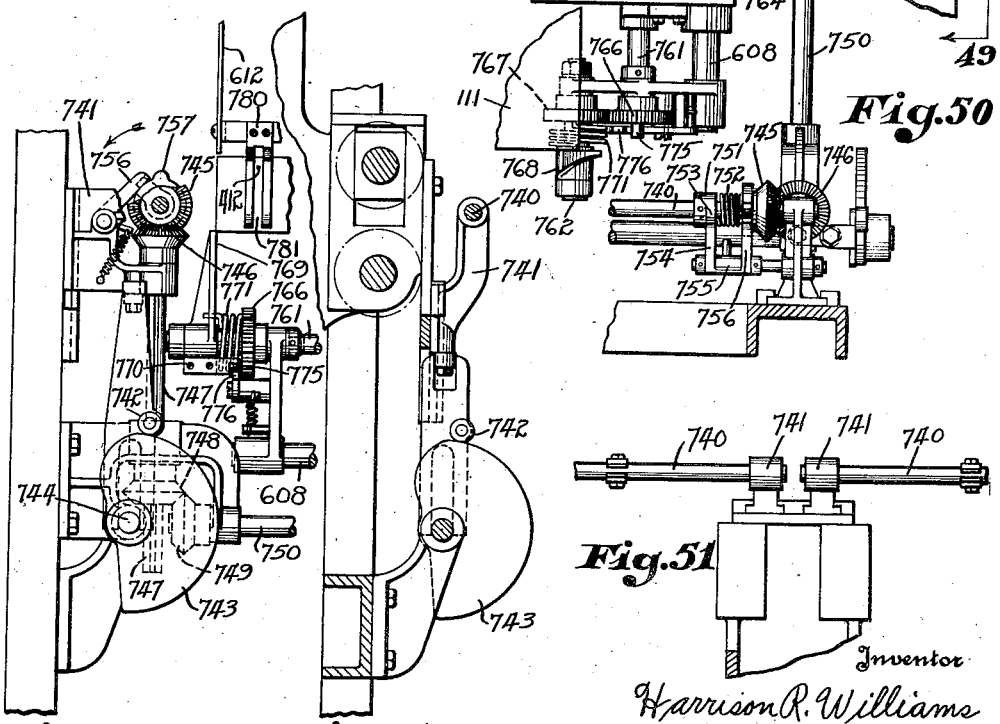

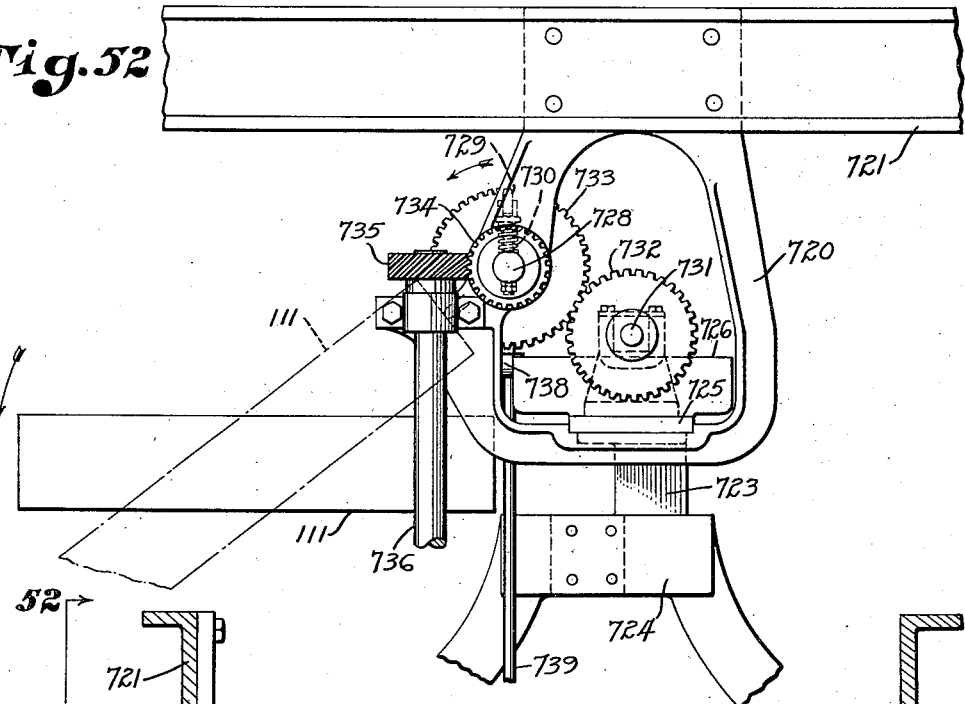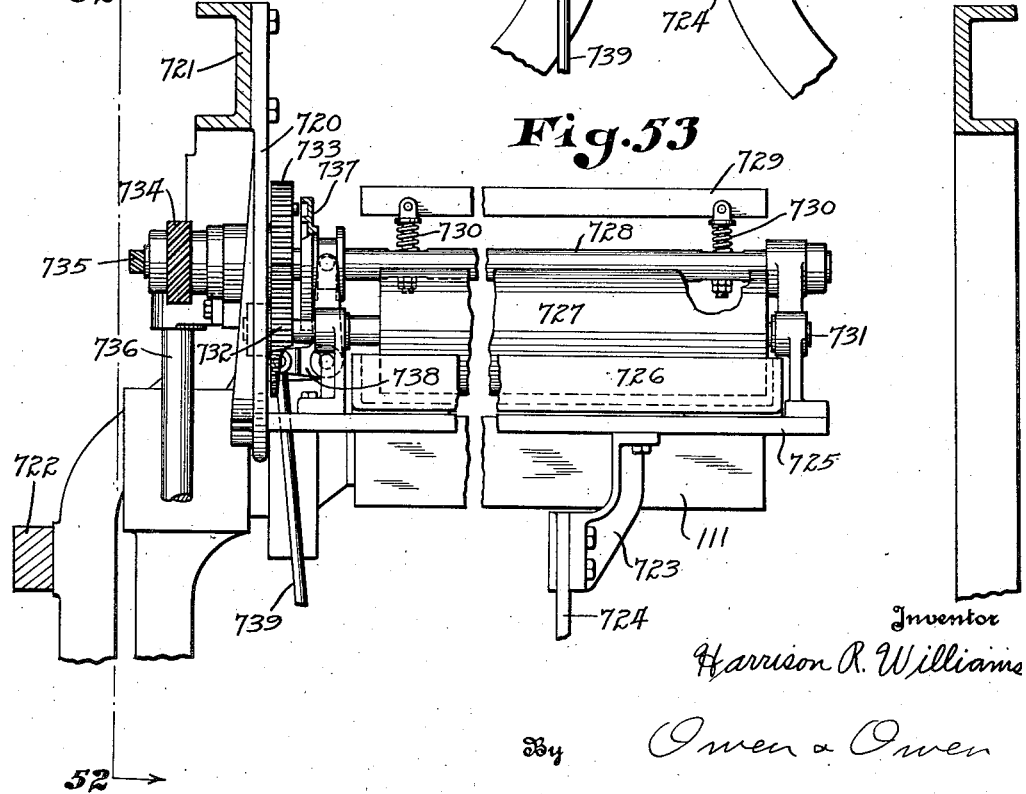

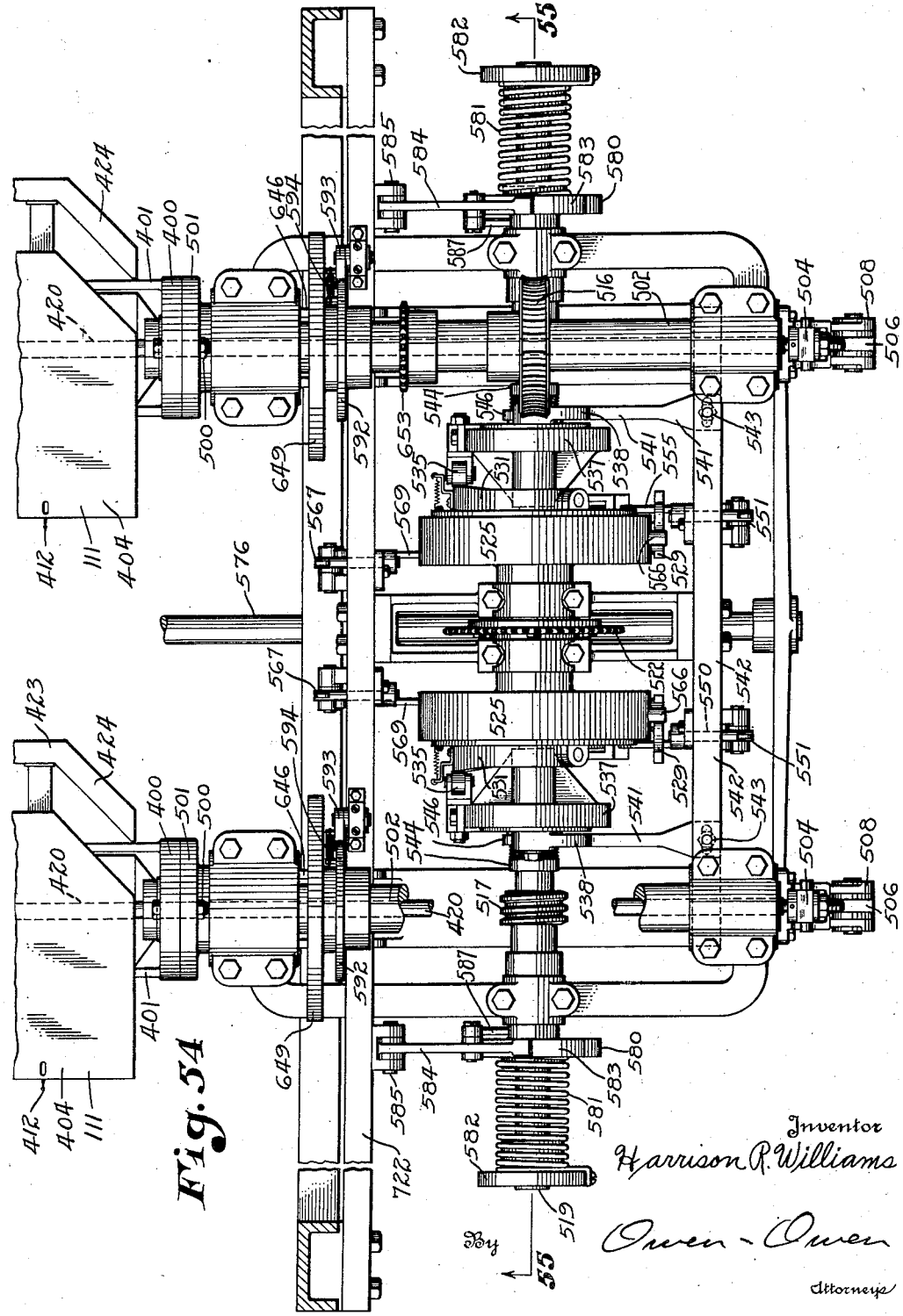

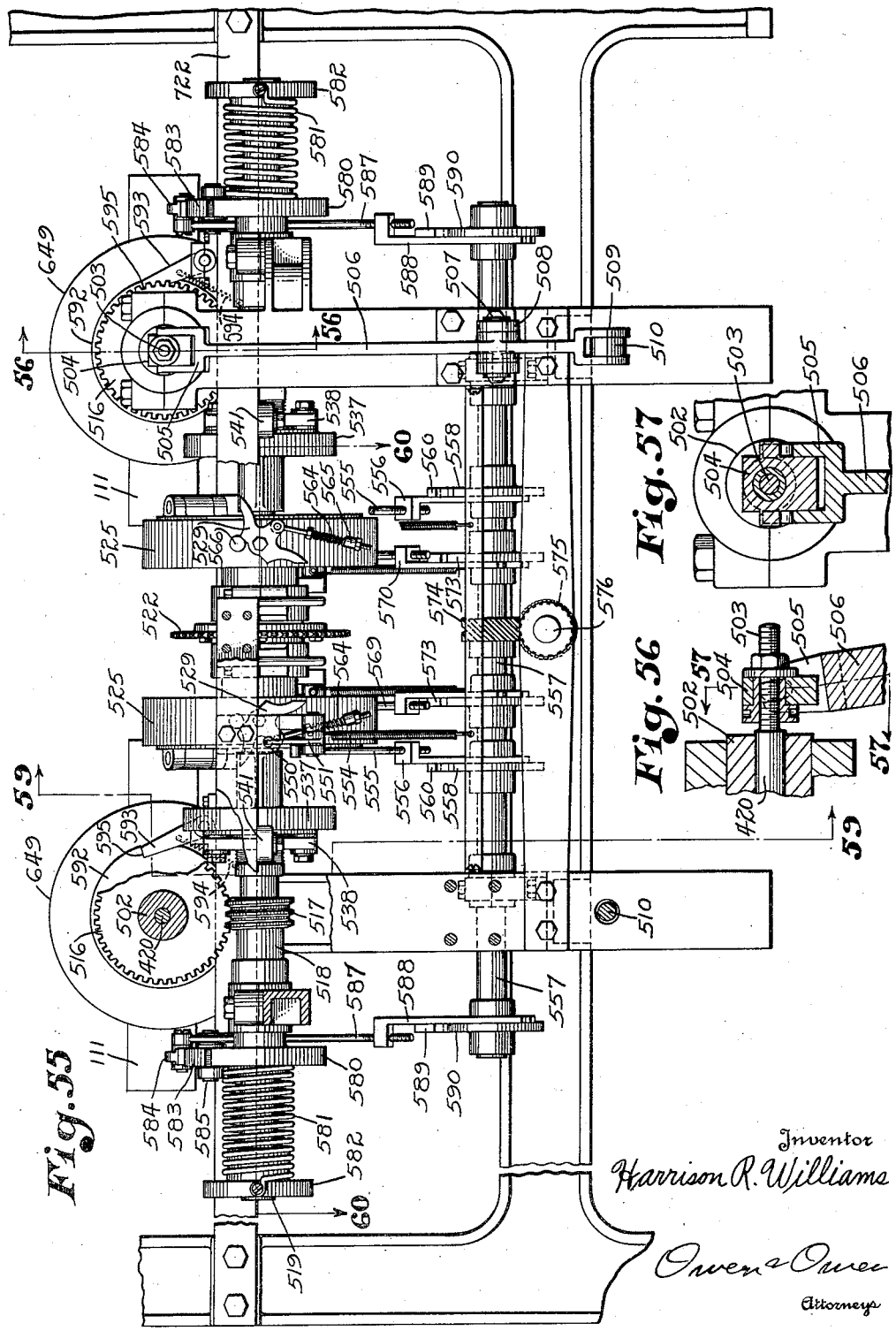

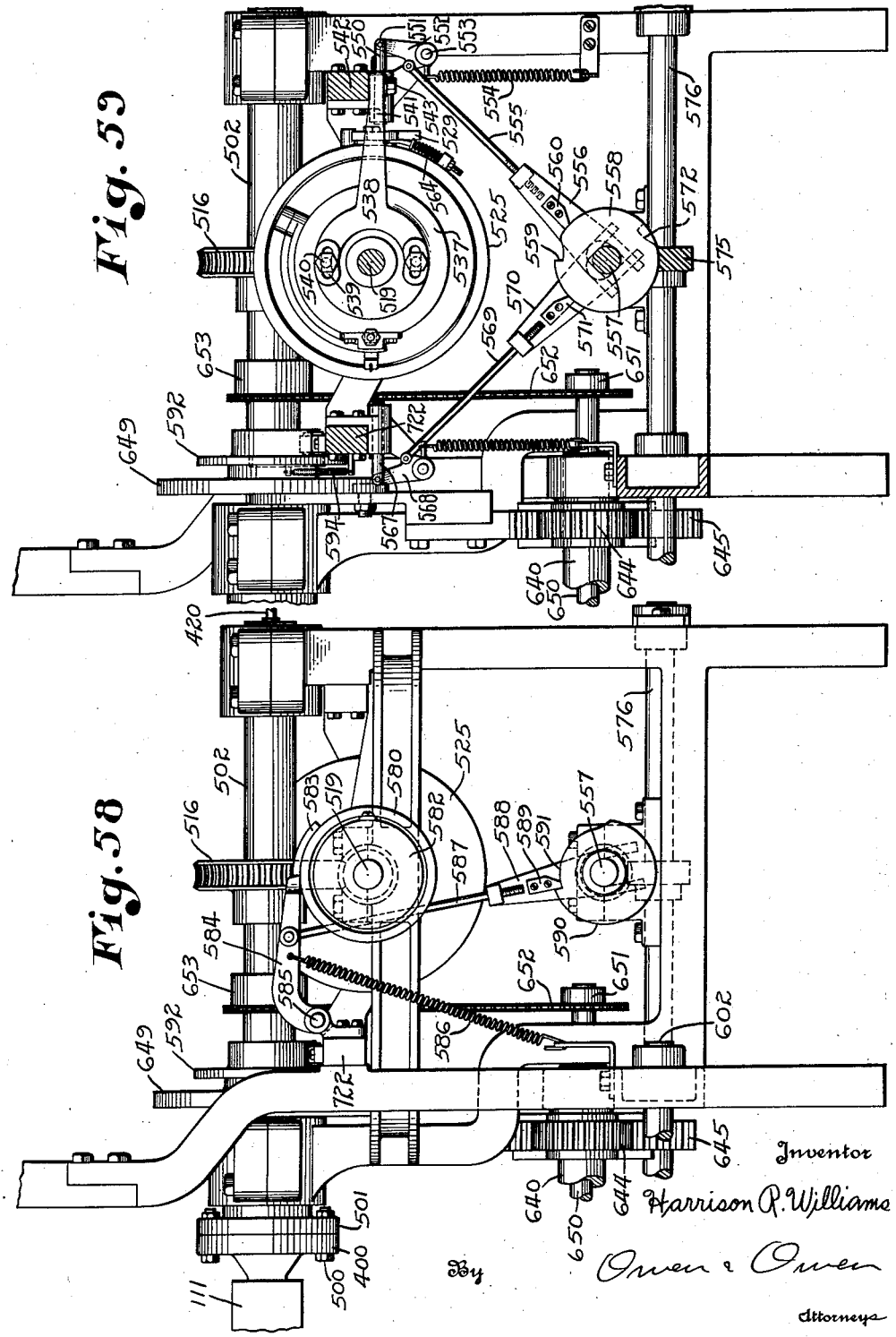

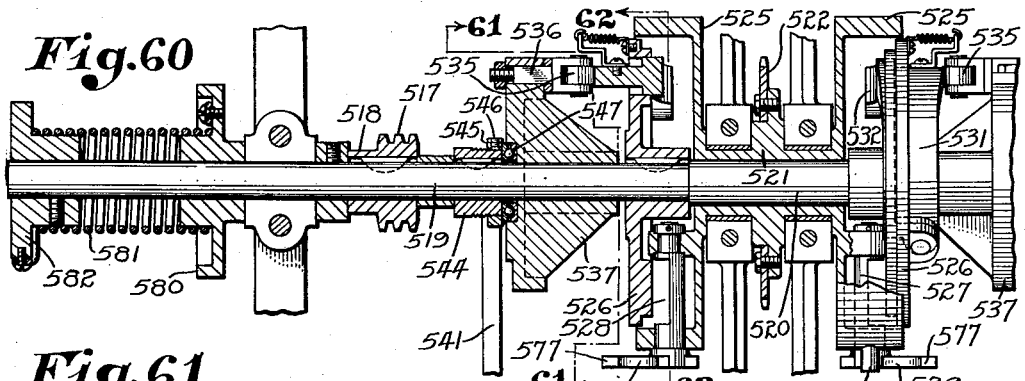
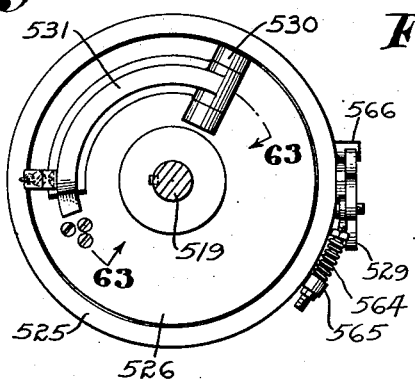
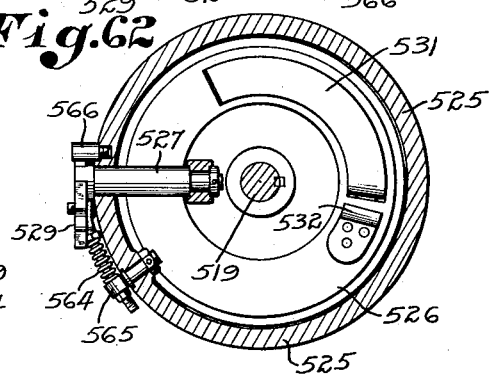
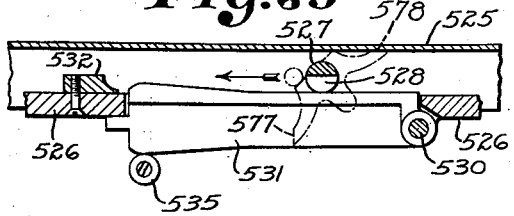
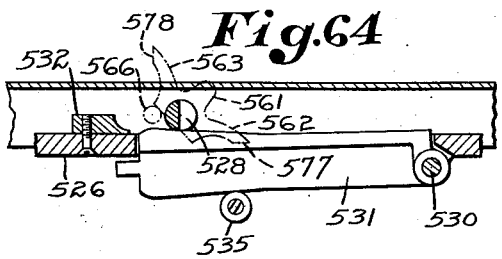
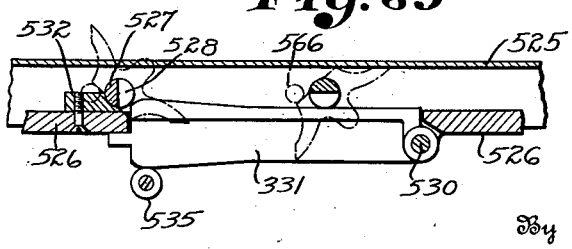

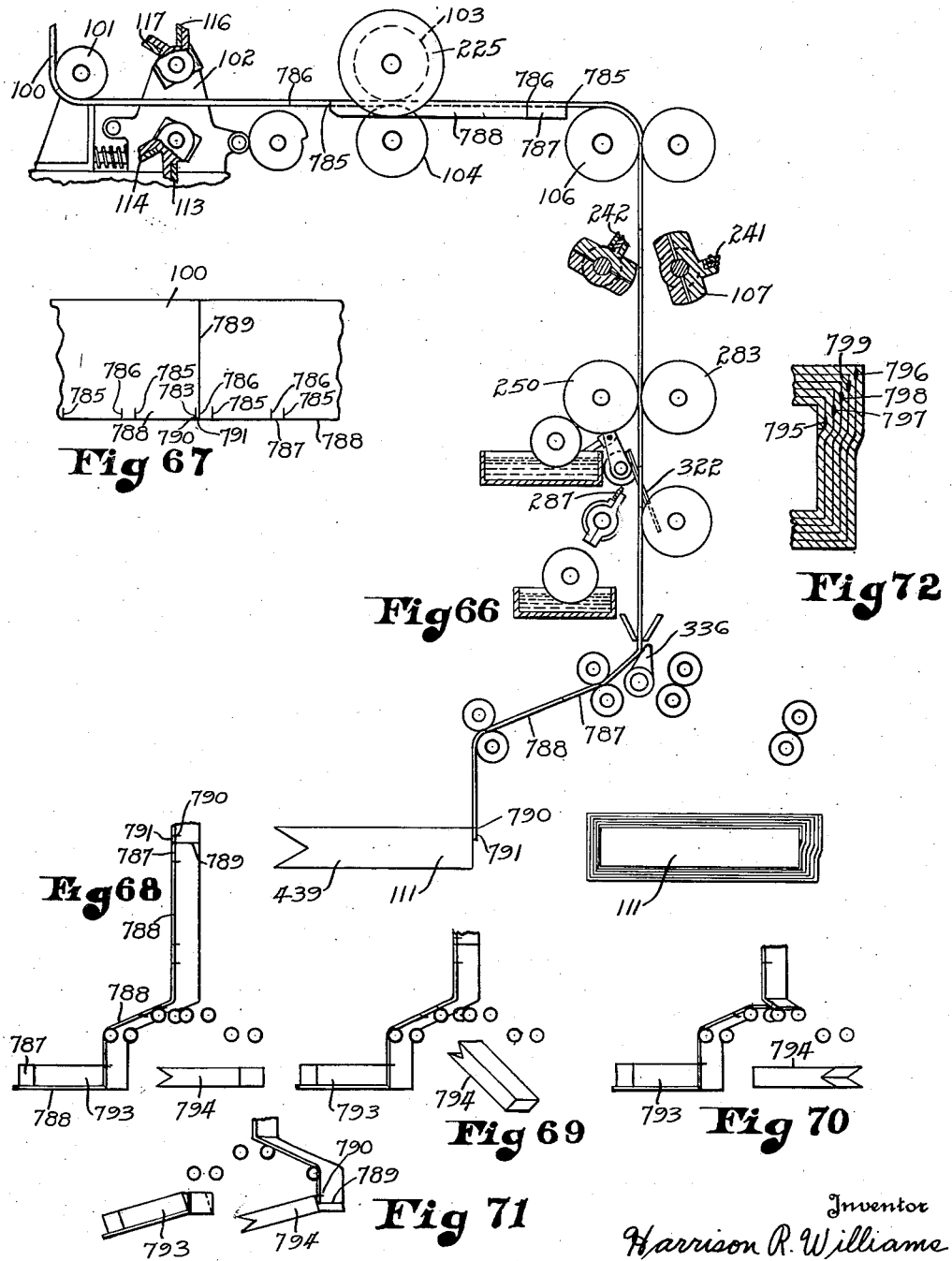

Patented Aug. 27, 1935

2,012,700

UNITED STATES PATENT OFFICE 2,012,700

BAG WINDING METHOD AND APPARATUS

Harrison R. Williams, New York, N. Y.

Application July 2, 1931, Serial No. 548,354

40 Claims. (Cl. 93—12)

This invention relates to a method and apparatus for forming bags with multiply walls. More particularly it relates to forming such bags by means of winding a sheet of paper spirally to form a tube and then closing one end of the tube to form a bag.

One object of the invention is to provide a method and apparatus by which such a bag may be formed in one operation with one end closed and with a corner tucked in to form a valve at the opposite end, if desired. Another object is to provide a method and apparatus whereby sheets of paper may be severed in succession from a continuous roll and wound into multiply tubes, one end of each tube being closed and the sides of the tubes being plicated and the completed bags discharged in collapsed condition. Other objects and details of the invention will appear as the description proceeds.

The invention will be described as embodied in one specific form, with some possible alternatives described. The general operation of the machine in which the invention is embodied is as follows:

The apparatus is provided with means for pulling a sheet of paper at an approximately uniform speed from any suitable source and presenting it to slitting, severing, pasting, winding and folding means. The slitting means provides slits in the edge of the paper to form separate flaps, the successive slits being spaced at different intervals apart to form flaps of different widths, for reasons which will be more fully pointed out in the detailed description.

The severing means cuts across the sheet, severing from the end a length sufficient to form the desired bag. However, the cut is at first incomplete, connections being left at intervals across the sheet to lead the paper through guiding and pasting devices. Paste-applying mechanism is provided which applies paste around the margin of each flap formed by said slits, provision being made to register the applied paste with the margins of the several flaps. Paste is applied also in strips across the sheet, as will be explained later.

Two mandrels are provided. After passing the paste-applying device just described, the paper is guided to one of these mandrels around which it is wound a plurality of times. The flaps are folded in succession against one end of the mandrel during the winding operation.

After the leading end of a length has been wound around the mandrel until the rear end of that length has passed the paste-applying device, guide switch fingers move across the path of the paper in line with the unsevered leading connections, severing said connections and diverting the oncoming end to the other mandrel.

The mandrel is rectangular in cross section, and after the paper has been completely wound thereon, the broader sides of the mandrel are caused to approach each other, and the paper at the narrower sides of the mandrel is pressed in to form gussets in the sides of the bag. If a valve bag is to be formed, one corner of the open end may be tucked in at the same time the bag is being gusseted and collapsed. Thereafter the collapsed bag is discharged from the mandrel, which is then in condition for receiving another length of paper. In this way, alternate lengths of paper are directed to the mandrels so that the paper may be supplied and wound continuously, with sufficient time for collapsing and discharging a completed bag from one mandrel while the other mandrel is receiving paper thereon.

In the accompanying drawings forming a part of this specification—

Figure 6:
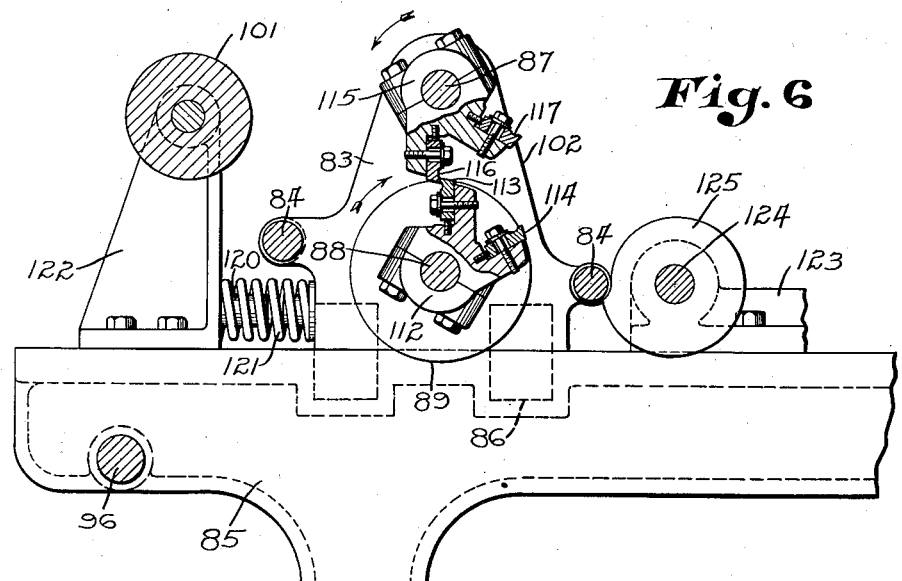
Figure 5:
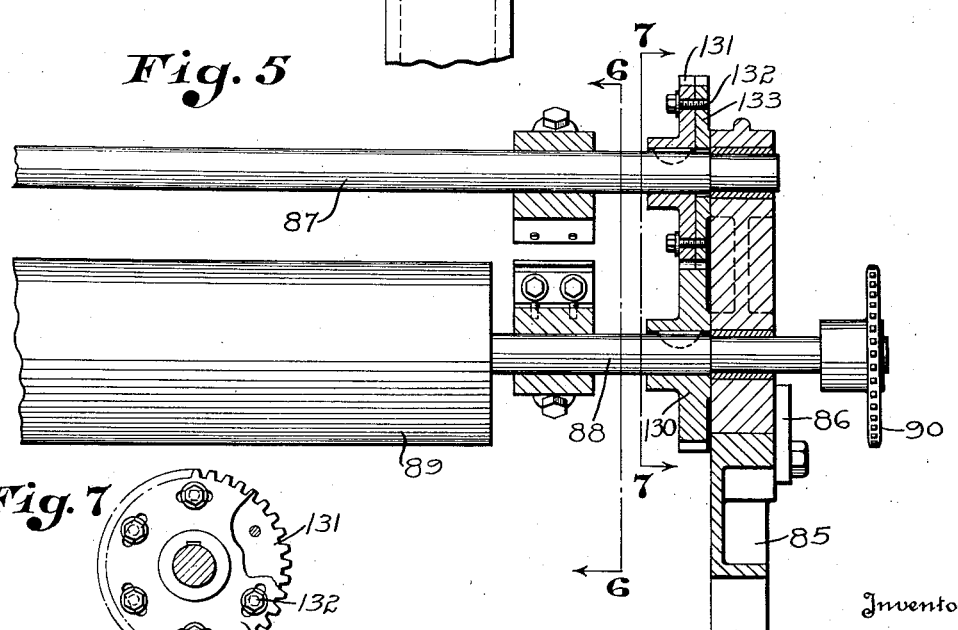
Figure 7:
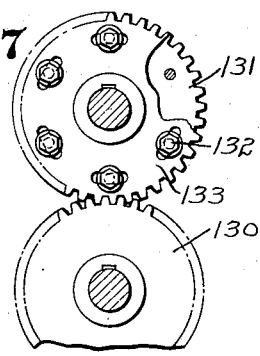
Figure 8:
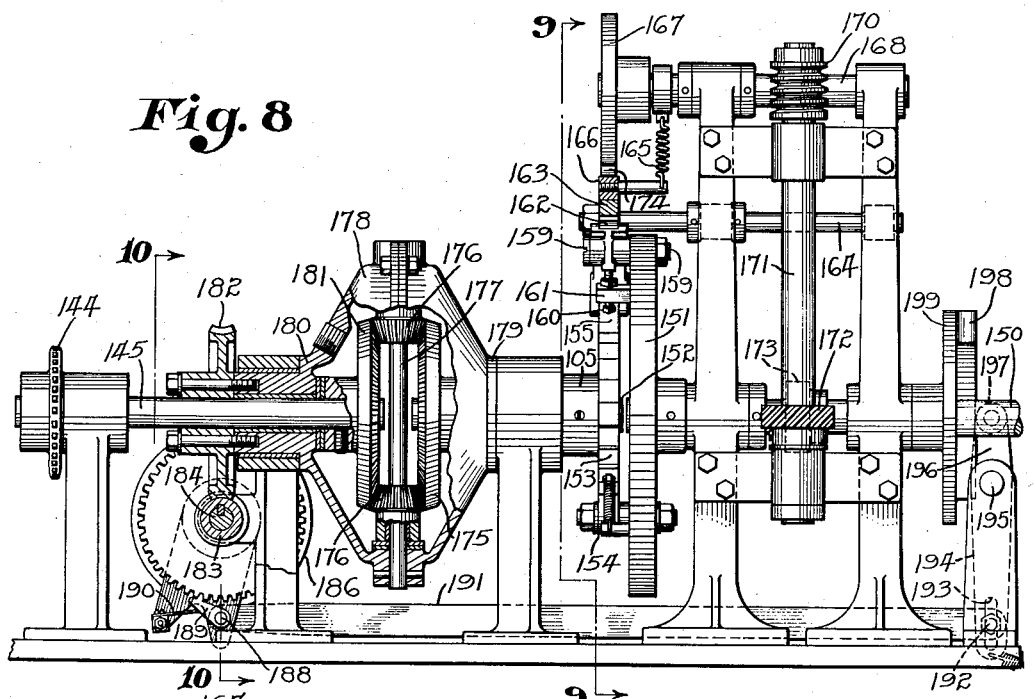
Figure 9:
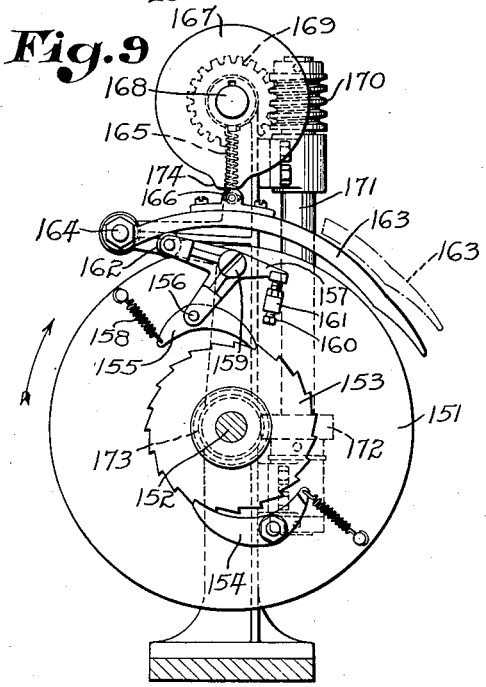
Figure 10:
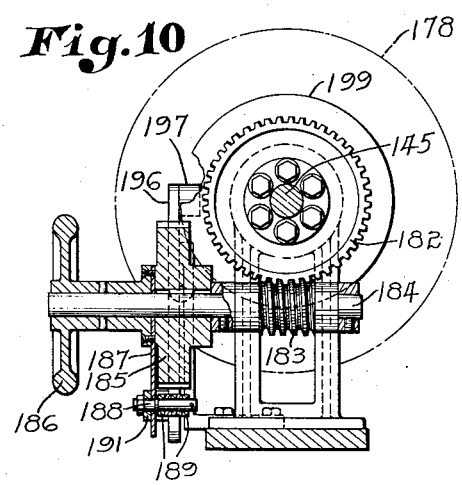
Figure 33:
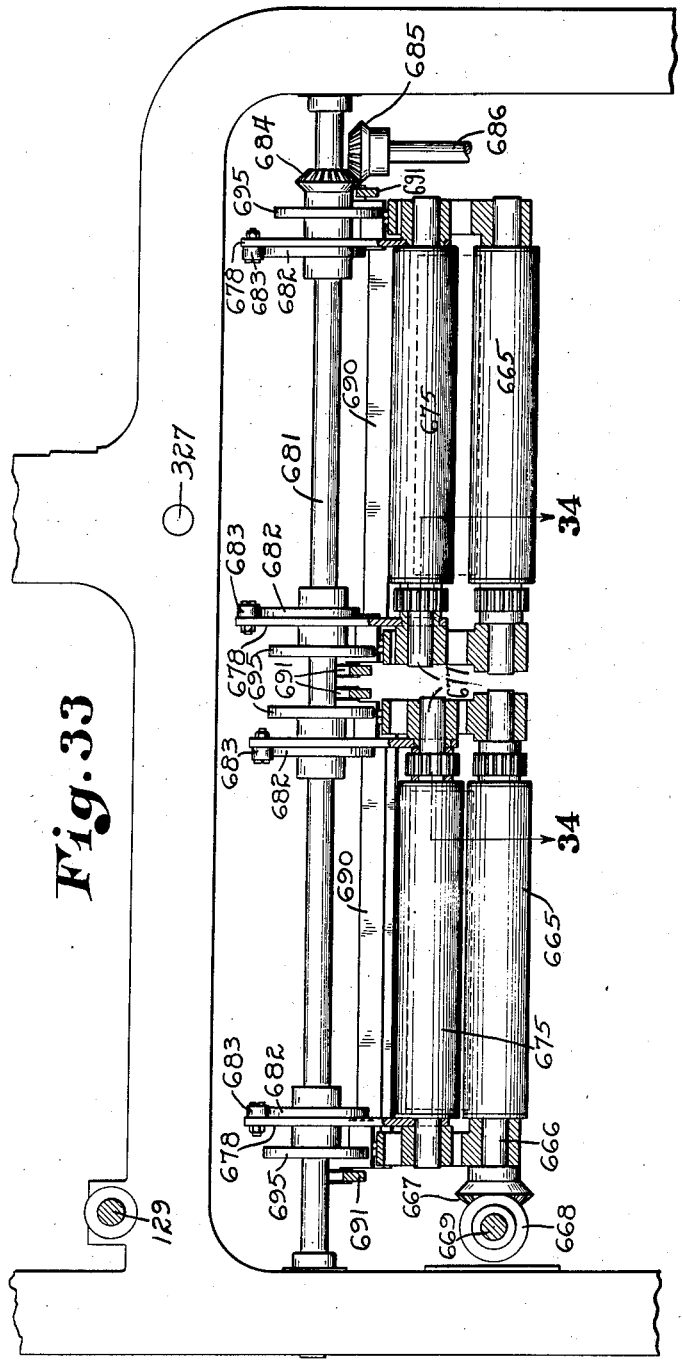

Fig. 1 is a front side elevation of apparatus embodying one form of the invention; Fig. 2 is an elevation of the apparatus as viewed from the right end of Fig. 1; Fig. 3 is a partial elevation similar to Fig. 2 and a partial section on the line 3—3 of Fig. 1; Fig. 4 is an elevation of the apparatus as viewed from the right of Fig. 2, with parts omitted; Fig. 5 is a detail view, partly in elevation and partly in section, of the initial slitting device; Figs. 6 and 7 are sections on the lines 6—6 and 7—7, respectively, on Fig. 5; Fig. 8 is a detail elevation of an adjustable driving device for the draw rolls; Fig. 9 is a section approximately on the line 9—9 of Fig. 8 and showing a portion of a periodic speeding up device; Fig. 10 is a section approximately on the line 10—10 of Fig. 8 showing a portion of an adjusting means; Fig. 11 is an elevation of the cutting rolls; Fig. 12 is a plan of the cutting rolls; Figs. 13, 14 and 15 are sections approximately on lines 13—13, 14—14 and 15—15 respectively of Fig. 11; Fig. 16 is a detail plan of part of the guiding and pasting means; Fig. 17 is a vertical section approximately along the line 17—17 of Fig. 16; Fig. 18 is a plan view of a portion of a pasting device; Fig. 19 is a detail elevation of a yielding bearing shown in Fig. 18; Fig. 20 is a horizontal sectional view with parts broken away and parts omitted, showing some of the operating cams and the final guiding members; Fig. 21 is a plan view of the guide immediately above the switching device; Figs. 22 and 23 are detail sections of the switch operating mechanisms; Fig. 24 is a detail section of one of the paster operating mechanisms; Fig. 25 is a detail of another pasting operating mechanism; Fig. 26 is a detail of the lifting mechanism for the pasting device; Fig. 27 is a diagrammatic plan view of the valve tucking device; Figs. 28 and 29 are sections on lines 28—28 and 29—29, respectively, on Fig. 27; Fig. 30 is a detail perspective of one of the members shown in Figs. 27 to 29; Fig. 31 is a vertical section through the final paper guides and tucking devices; Fig. 32 is a plan view substantially on the line 32—32 on Fig. 31; Fig. 33 is a section approximately along the line 33—33 on Fig. 32; Fig. 34 is a detail section approximately along the line 34—34 on Fig. 33; Fig. 35 is a section approximately along the line 35—35 on Figs. 32 and 34; Fig. 36 is a section approximately along the line 36—36 on Fig. 32; Fig. 37 is a view showing a different position of some of the parts shown in Fig. 36; Fig. 38 is a plan of a winding mandrel; Figs. 39 and 40 are sections on the lines 39—39 and 40—40, respectively, on Fig. 38; Fig. 41 is an enlargement of the left portion of Fig. 39; Fig. 42 is similar to Fig. 41, but shows the parts in the position they assume when the mandrel is collapsed; Fig. 43 is an enlarged view of the right side of Fig. 39, showing the parts in the position they assume when the mandrel is collapsed; Fig. 44 is an enlarged view of the mandrel with parts in section, and showing the operating mechanism for the end slide; Fig. 45 is an elevation of the end slide of the mandrel, viewing the lower left corner of Fig. 44 from below; Fig. 46 is a view, on the sheet with Fig. 2, of a detail of a folding arm; Fig. 47 is a view taken approximately on the line 47—47 on Fig. 3, showing an alternative folding means; Figs. 48 and 49 are views substantially on lines 48—48 and 49—49, respectively, on Fig. 47; Fig. 50 is a detail plan viewed substantially on the line 50—50 on Fig. 47; Fig. 51 is a detail section on the line 51—51 on Fig. 47; Fig. 52 is a view of an alternative form of pasting device, taken substantially on the line 52—52 on Fig. 53; Fig. 53 is a section substantially on the line 53—53 on Fig. 4; Fig. 54 is a plan of the driving mechanism for the mandrels, viewed from approximately the line 54—54 on Fig. 4; Fig. 55 is an irregular vertical section and elevation of the drive device for the mandrels, taken approximately along line 55—55 on Fig. 54; Fig. 56 is a detail section of the clutch operating mechanism on the line 56—56 on Fig. 55; Fig. 57 is a section on the line 57—57 on Fig. 56; Fig. 58 is an elevation of the mandrel driving mechanism as viewed from the left of Fig. 55; Fig. 59 is a sectional view on the line 59—59 on Fig. 55; Fig. 60 is a detail section of the clutch mechanism on the line 60—60 on Fig. 55; Figs. 61 and 62 are detail sections on lines 61—61 and 62—62, respectively, on Fig. 60; Fig. 63 is a diagrammatic view substantially on the line 63—63 on Fig. 61; Figs. 64 and 65 are views similar to Fig. 63 but showing the parts in different positions; Fig. 66 is a diagrammatic side elevation indicating the course of the paper through the successive devices; Fig. 67 is a diagrammatic plan view of a portion of a severed strip, showing the relation of the line of severance to the edge slits; Figs. 68, 69, 70 and 71 are diagrammatic views illustrating the transfer of the end of the paper from one mandrel to the other; and Fig. 72 is a diagrammatic enlarged section of one side of the completed bag, showing the operations of the successive cross strips of paste.

Considering first the general arrangement of the device as viewed in Fig. 1, a sheet of paper 100 is received at the upper left corner of the machine and directed by a guide roll 101 to a slitting device designated generally by 102. From this slitting device it moves to the pull rolls 103 and 104. These pull rolls are driven at a substantially constant speed, but one which is subject to slight variations and to very accurate adjustment by driving means indicated generally by reference numeral 105. From the pull rolls the paper moves to guiding rollers 106 and then downwardly past cutting members designated generally by reference numeral 107 and through pasting devices designated generally by reference numeral 108 to a switching device 109. From the switching device it moves through one of two similar guiding members 110 to one of the mandrels 111 where it is wound, collapsed and discharged, as generally described above.

Having indicated the general course of the paper through the machine, the several operating parts will be described in detail.

The slitting device 102 is mounted upon brackets 83 which are connected by rods 84 to form a frame. The brackets are slidably mounted upon the upper sides of side frame members 85 being held thereon by guide members 86. The side frames of the machine 85 are connected together by rods 96 and other suitable connecting cross pieces, so as to form a frame for the operating parts of the mechanism, which need not be described in detail.

Mounted in brackets 83 are shafts 87 and 88. See Figs. 5 and 6. Shaft 88 carries a guide roll 89 over which the paper runs, and is provided at its end with a sprocket wheel 90 driven by a chain 91, which will be referred to later. Shaft 88 also carries a slitter 112 which includes two knives 113 and 114. Shaft 87 carries a cooperating slitting member 115 with two knives 116 and 117. These knives are positioned to slit the edge of the paper which extends beyond the right end of roll 89, as viewed in Fig. 5, and passes between the slitters. The knives are so spaced as to have therebetween a peripheral distance on the one side substantially equal to the narrow side of the mandrel, and on the other side substantially equal to the broad side of the mandrel, and the parts are timed so that the slits will come substantially at the corners of the mandrel.

As the paper is wound around the mandrel the diameter around which it is wound increases, so that, if uniform distances are left between the slits, they will not continue to come at the corners of the mandrel. In order to take care of this feature and to bring successive slits exactly where desired with relation to the mandrel, provision for sliding the slitter bodily in the direction of the length of the paper passing therethrough is made. As previously indicated, brackets 83 are slidable on the frame of the machine. Guide pins 120 are provided for directing the movement of these brackets and springs 121 are inserted around these guide pins and between brackets 83 and 122 supporting roller 101. In this way, brackets 83 are constantly urged away from brackets 122 and in the line of the movement of the paper.

On frames 85, in a direction toward which brackets 83 are urged to move, there are provided brackets 123 carrying a shaft 124 which in turn bears cams 125 acting against brackets 83 and forcing them to the left against the action of springs 121. Shaft 124 is provided on its end with a sprocket 126 driven by a chain 127 from a sprocket 128 on a drive shaft 129.

Mounted on shaft 88 there is a gear wheel 130 which meshes with a gear wheel 131 keyed on shaft 87. A gear disk 133 is attached by a bolt and slot connection 132 to gear 131 and is adjustable so as to prevent any excessive play between the teeth of the gears and consequently the exact registration of the slitting members is insured. The drive gears are so proportioned that the slitters are driven the required number of times to form the successive slits in a strip long enough to form a complete bag while cams 125 are turning once. It will be readily understood that, when the cams drive brackets 83 towards brackets 122, the distance between successive slits is lengthened, because the travel of the slitter carrier is added to the travel of the paper in spacing successive slits. In this way, it is possible by properly shaping the cams 125 to regulate exactly the distance between successive slits, especially when this regulation is taken in conjunction with the regulation of the pull rolls, which will be described next.

Pull rolls 103 and 104 are mounted upon shafts 135, 136 which in turn are mounted in brackets 137 resting on side frames 85. See Fig. 1. Shafts 135, 136 are provided with meshing gears 138 and 139 whereby they are driven in synchronism. The gear 139 meshes with gear 140 and is mounted upon a shaft 141 which carries also a sprocket 142 driven by a chain 143 from a sprocket 144 mounted upon a shaft 145. Shaft 145 is driven by the mechanism shown in detail in Figs. 8, 9 and 10, which show the driving mechanism previously referred to, generally by the reference numeral 105.

In this driving mechanism there is a drive shaft 150 which receives continuously applied power in a manner which will be described later. See Figs. 8 to 10. On the end of shaft 150 there is provided a disk 151. Shaft 150 is in alinement with a shaft 152 on which there is a ratchet wheel 153 adjacent to disk 151. Pivoted on disk 151 there is a pawl 154 which engages ratchet wheel 153 in the usual manner. There is also a pawl 155 pivoted at 156 on a pawl carrier 157 and normally pressed into engagement with ratchet wheel 153 by a spring 158. Carrier 157 is pivoted at 159 on disk 151 and has an arm normally engaging a screw 160 mounted in a lug 161 on disk 151. Carrier 157 has another arm carrying a wheel 162. Above the path of wheel 162 there is a cam member 163 pivoted on the frame at 164 and normally moved upward by a spring 165 to the position in which it is indicated in dotted lines in Fig. 9. Member 163 carries on its upper side an anti-friction roller 166 in contact with a cam 167 on a shaft 168. Also mounted on shaft 168 there is a worm wheel 169 in mesh with a worm 170 upon a vertical shaft 171, the lower end of which carries a spiral gear 172 meshing with a similar spiral gear 173 on shaft 150.

Cam 167 is provided with a rise 174 which depresses member 163 once during each revolution of cam 167. The gears are so arranged that cam 167 rotates once while each length of paper for a bag is being passed through the pull rolls. When member 163 is depressed as shown in full lines in Fig. 9, roller 162 contacts therewith and is driven downward during the revolution of disk 151 and thereby swings pawl 155 forward in the direction of movement of the disk and this forces ratchet wheel 153 and shaft 152 to turn more rapidly than disk 151. The parts are so adjusted that this forward movement of pawl 155 moves the ratchet 153 one notch ahead relative to pawl 154, which immediately drops behind the next tooth and holds the parts in that relation. After roller 162 moves from under member 163, pawl 155 is returned to its normal position, shown in Fig. 9 and continues therein during successive revolutions of disk 151 until member 163 is again lowered.

On the opposite end of shaft 152 from ratchet wheel 153 there is a gear 175 which meshes with idler gears 176 mounted upon a shaft 177 in a cage 178, the cage being provided at one end with a sleeve 179 mounted upon shaft 152 and at the other end with a sleeve 180 mounted upon shaft 145. Shaft 145 carries a gear 181 meshing with the other side of idler gears 176 and normally driven thereby in the opposite direction from, but at the same speed as, gear 175.

Mounted upon the end of sleeve 180 there is a worm wheel 182 in mesh with a worm 183 on a shaft 184. Shaft 184 is provided with a ratchet wheel 185, and with a hand wheel 186, by either of which it may be turned. Pivoted upon shaft 184 there is an oscillatable member 187 carrying a pin 188 on which there are mounted a plurality of pawls 189 which have teeth at slightly different distances from the pin, the pawls being pressed into engagement with ratchet wheel 185 by springs 190 and being so arranged that there cannot be at any time a return of ratchet wheel 185 with respect to the pawls of more than a small fraction of one tooth.

Also pivoted on pin 188 there is a link 191, the other end of which is pivoted by an adjustable pin and slot connection 192 and 193 to the lower arm 194 of a lever fulcrumed at 195. The upper arm 196 of the lever carries a wheel 197 in the path of the cam member 198 on a cam disk 199 carried by shaft 150, so that rock shaft 195 is given an oscillation during each rotation of shaft 150, and the extent to which this oscillation moves link 191 is adjustable by pin and slot connection 193, so that ratchet wheel 182 is driven forward a slight distance each revolution of shaft 150 and this distance is accurately adjustable. In this way, cage 178 is driven so as to impart a slight differential movement between shafts 150 and 145, and this differential movement is accurately adjustable. Furthermore, by means of hand wheel 186 a precise adjustment of the relation of shaft 145 to the rest of the mechanism may be made at any time.

Shaft 150 has on the end thereof a sprocket wheel 200, see Fig. 4. This wheel is driven by a chain 201 from a sprocket 202 on a shaft 203. Shaft 203 carries a worm wheel 204 driven by a worm 205 on main drive shaft 206, which may be driven by an electric or other motor, or by means of a belt pulley 207, as desired.

Shaft 203 carries another sprocket wheel which drives a chain 209 engaging a sprocket wheel 210 on shaft 211. Shaft 211 carries a gear wheel 212 in mesh with a gear 213 on a shaft 214. A sprocket 215 on shaft 214 drives a chain 216 engaging a sprocket 217 on a shaft 601, to be described later. The other end of shaft 601 carries a sprocket wheel 218, see Fig. 1, which drives a chain 219 which in turn engages a sprocket on shaft 129 from which the slitter cam shaft 124 is driven as previously described. Shaft 203 also carries a sprocket wheel 221 which drives a chain 222 which engages sprocket wheel 90 on shaft 88.

The gears are so proportioned that shaft 203 makes one revolution substantially during the time while paper long enough to make one half of one wrap around the mandrel is being drawn through pull rolls 103 and 104. The speeding up of shaft 145 above the speed of shaft 150 is sufficient to provide for the increasing length of the outer plies of paper around the mandrel, and also, when pawl 155 is actuated, to provide for a lap so that the paper goes around the mandrel a little more than an even number of times. In the construction shown, the gears are of a size to provide for substantially five layers of paper around a mandrel for a bag. Shaft 129 is driven so that it rotates once for every twenty revolutions of shaft 203, so that it revolves once while two bags are being made. Shaft 124 is driven at twice the speed of shaft 129, so that it rotates once for each bag that is formed, while the slitters rotate at the same speed as shaft 203, or ten times for the formation of each bag.

As best seen in Fig. 3, the pull roll 103 may be discontinuous, comprising spaced wheels, or it may be continuous if preferred. The left ends of left roller 103 and of roller 104 terminate short of the left side of the paper, as viewed in Fig. 3, and are substantially in alinement with the left end of the mandrel 111, as viewed in that figure. Against the left face of wheel or roll 103 there is a bevelled disk 225 slidable upon shaft 135, but normally held against the face of roll 103 by a spring 226 between the disk and a collar 227 fixed on the shaft. This disk suffices to bend the paper against the end of roll 104 and thereby crease the paper along the line which will register with the end of the mandrel when the paper is wound thereon. The paper passes horizontally from the pull rolls over roller 106 and downward between that roller and a roller 228, which is mounted in slidable bearings 229 and normally pressed by springs 230 toward roller 106. The rollers are retained in timed relation by meshing gears 231 and are driven from shaft 136 by a chain 232, so that they move in timed relation with the pull rolls.

From rollers 106 and 228 the paper passes downward through the cutting device 107 which comprises a cutter carrier 233 driven by a gear 234 which preferably comprises two gear disks adjustably attached together by a bolt and slot connection 235 and which meshes with a gear 236 upon an abutment carrier 237. See Figs. 11 to 15, for details of the cutter. Carrier 237 is driven by a sprocket wheel 238 which engages a sprocket chain 239 driven from a sprocket wheel on shaft 203. Carrier 233 carries a cutter 241 while carrier 237 carries an abutment 242. Gears 234 and 236 are provided with an unequal number of teeth so that the cutter and abutment will register only once during ten revolutions of shaft 203. At the left end of the carriers, as viewed in Figs. 3, 11 and 12, there is a short knife and abutment 243 and 244 respectively, which are arranged behind knife 241 and abutment 242 in the direction of travel of the respective members so that the cut at the end of the paper is off set from the main cut across the sheet.

As indicated at 245 the knives and abutments are discontinuous, so that the cut does not extend clear across the paper. Carriers 233 and 237 are provided with flanges 246 which aid in guiding the paper.

As clearly appears from Figs. 3 and 11, the right side of the cutter carrier, as viewed in those figures, is lower than the left side and, as will readily appear from Fig. 12, the right side of the knife and abutment respectively, are behind the left ends in their direction of travel. This lag in the cutter and abutment on the periphery of the carriers is equal to the drop of the right end of the carriers. The peripheral speed of the knife abutment is substantially the same as the speed of the paper, and therefore, when the turn is reached in which these members register, they start a shear cut first along the left side of the paper, as viewed in the figures under discussion, and then continue the cut across the paper, so that the cut is completed in the length of time the paper moves downward the distance between the elevation of the left end and the elevation of the right end, whereby a straight cut across the paper results, and at the same time it is a progressive shear cut.

The split gear 234 can be adjusted so as to prevent any material backlash between that and gear 236, and thereby insure the correct registration of the knife and abutment upon the proper turn of the device being used.

Beneath the cutters there is a feed roll 250 past which the paper is fed. See Figs. 3 and 16. On the other side of the paper there is mounted a rod 251 carrying adjustable brackets 252 in the lower ends of which there is mounted a shaft 253. On shaft 253 there is a pair of rollers 254 and 255, each having a soft rubber tire 256 adapted to press the paper against roll 250. The ends of shaft 253 are separately adjustable toward and from roll 250 by hand wheels 257 and 258. Rollers 254 and 255 are rigidly mounted on shaft 253 so that they are compelled to make the same number of revolutions. If hand wheel 257 is operated to press roller 254 against roller 250 harder than roll 255 is pressed, the rubber on roll 254 is compressed to make it of smaller effective diameter than the effective diameter of roll 255. Since the two rollers are compelled to rotate the same number of times, the larger effective diameter of roller 255 tends to move the paper slightly faster than it is moved by 254. By tightening hand wheel 258 the feed of the two rollers is equalized. It will be readily seen from the above that the direction of the paper may be governed very accurately by adjustment of hand wheels 257 and 258.

The left end of roller 250, as viewed in Figs. 2 and 3, is supported by a bracket 261 which extends inward from the side frame of the machine and then downward so as to leave a free space between the frame of the machine and the end of roller 250 in axial alinement therewith. In this space and in the space immediately below rollers 250, 254 and 255 there is arranged a pasting device.

The pasting device comprises end frames 262 and 263, to which are attached slides 264 and 265 which are vertically movable in slots 266 and 267 in the side frames. For details of the pasting device see Figs. 1 to 4, 16 to 19 and 24 to 26. Beneath the slides there are springs 268 and 269, (see Figs. 1 and 3) which take up a considerable part of the weight of the slides and parts connected thereto, but not sufficient to raise the slides. Extending downward from frame members 262 and 263 there are similar supporting feet 270 which rest upon cams 271, operated in a manner to be described later.

Supported by the upper part of end frame 262 there is a pasting device which operates in the space at the end of roller 250 to apply paste to the end flaps of the paper. This arrangement comprises a paste pot 275 in which there is mounted a roller 276. A paste applying member 277 is mounted upon a shaft 278 driven in timed relation with roller 276 by means of meshing gears 279 and 280. Roller 277 has pads or raised members 281 arranged in patterns thereon to apply paste along the margins of the flaps, the patterns being arranged so as to paste alternately a broad flap and a narrow flap. The end frame member also carries a stub shaft 282 carrying a roller 283 adapted to form an abutment roller holding the paper against the raised pattern on roller 276. Shaft 282 carries a gear 284 meshing with gear 289.

Mounted in both end frames there is an abutment roller 285 beneath roller 283 and extending clear across the width of the paper. Parallel with roller 285 there is mounted a shaft 286 carrying a paste pad 287, this paste pad constituting a bar which extends entirely across the width of the paper except where it is interrupted by notches 297 in line with guide members described later.

The end frames also support a paste pot 288 in which there runs a roller 289 mounted upon a shaft 290. Shaft 290 carries a gear 291 meshing with a gear 292 on shaft 286. Gear 292 meshes with gear 293 on the end of shaft 294 of roller 285. A sprocket chain 295 runs over suitable sprocket wheels on shaft 294 and on shaft 282 carrying roller 283 and gear 284, so the pasting devices operate in timed relation.

Shaft 286 carries arms 298 having slots 299 receiving pins 300 of paste bar 287. Spring 301 normally presses bar 287 outward to the limit of slots 299, so that it yieldingly contacts paste roller 289 and the paper held against it by roller 285. See Figs. 18 and 19.

Shaft 278 is mounted in an arm 302 pivoted on the shaft 303 of roller 276. See Figs. 17 and 24. Pivoted to a lug on arm 302 there is a rod 304 extending to a head 305 which is slotted at 306 to receive shaft 129, and has a roller 307 adapted to ride against a cam 308 on shaft 129. A spring 309 normally holds roller 278 as far to the right, as viewed in Fig. 24, as it is permitted to move by cam 308. Rises 310 on cam 308 move roller 278 away from the paper twice during each rotation of shaft 129, each time long enough to leave unpasted at least two flaps of the paper. The movement is just enough to make the paste pads miss the paper, and not enough to move gear 289 out of mesh with gear 284.

The parts are so timed that the unpasted end flaps are those which immediately follow the cut across the paper, whereby the end flaps first wound on the mandrel are not pasted. The exact length of the unpasted portion is determined by the length of rises 310 on cam 308, and whether two, three or four flaps are unpasted may be determined in accordance with the size of the flaps, as will be explained later.

At the right end of the apparatus, as viewed in Fig. 16 there is a bracket 311 attached to the frame, and this bracket supports a pasting device for applying occasional dabs of paste to this side of the paper. A paste pan 312 has running therein a paste roller 313 delivering paste to an applying roller 314 which applies the paste opposite to the end of roller 250. Roller 314 is mounted on a shaft 315 in a bearing in oscillatable member 316 pivotally mounted upon the shaft 317 of roller 313. A train of gears designated generally by 318, and which need not be described in detail, drives rollers 313 and 314 from gears 272 on the end of shafts 294 and 286. See Fig. 4. Oscillatable member 316 has connected thereto a rod 319 which is operated by a cam 320 on shaft 129, see Fig. 20, so as to bring roller 314 into paste applying relation with the paper at desired intervals, as will be explained later.

Mounted in end frames 262 and 263 above shaft 286 there is a rock shaft 321 bearing fingers 322 adapted to bear against paste bar 287. An arm 323 extends upward from shaft 321 and is connected to a rod 324, the other end of which is attached to a head 325 actuated by a cam 326 on shaft 129, as clearly appears from Fig. 25. By this means bar 287 may be forced away from the paper when it is not desired to have the paste applied across the paper, the construction shown being such as to allow the application of paste every other revolution of shaft 286, or once for each revolution of the mandrel.

Cams 271, on which rest the legs 270 of the paste applying frame, are mounted upon a shaft 327. This shaft has thereon an arm 328 connected by a link 329 to a head 330 having a slot 331 therein, which receives shaft 129. A roller 332 on head 330 rides against a cam 333 on shaft 129 and pulls link 329 to rock cams 271 and controls the elevation of the paste applying frames during the application of paste to a bag making the length of paper, so as to space successive applications of paste approximately as desired.

Mounted on rock shaft 327 there is rock sleeve 335 carrying switch fingers 336. See Fig. 31. Immediately above shaft 327 there are bars 337 having fixed thereto fingers 338 and bars 337 being mounted on wedging carriers 339 for exact adjustment so that fingers 338 guide the paper to a position centrally above shaft 327. Mounted on sleeve 335 there is an actuating member 340 connected to a rod 341 telescoping within a sleeve 342. See Fig. 22. Sleeve 342 is attached to a head 343 which embraces an eccentric 344 on shaft 129. Within sleeve 342 rod 341 is provided with a collar 345. Between collar 345 and a shoulder 346 in sleeve 342 there is a spring 347, and between the collar and a perforated stop nut 348 at the end of sleeve 342 there is a spring 349, so that rod 341 may yieldingly move in either direction with respect to sleeve 342, but is always pressed towards a normal median position with respect thereto. The oscillating sleeve 335 in response to these alternately compressed springs is governed by catches connected with a strap 334, to be described later.

On the two sides of shaft 327 and slightly therebelow, there are mounted guides for guiding the paper to the mandrels. See Figs. 20, 21 and 33. Inasmuch as these guides are of identical construction, except that one is right hand and one is left hand, only one need be described in detail and the same reference numerals are applied to like parts on the two guiding constructions.

Below, at one side of, and parallel with, shaft 327 there is a shaft 350 upon which there are pivoted guiding frame members 351. Rollers 352 are mounted upon shaft 350, which is driven as will be described later. In the free end of frame members 351 there is mounted a shaft 353 which carries rollers 354 and is connected to turn with shaft 350 by means of a sprocket chain 355. To a lug 356 at the free end of frame 351 there is attached a tension spring 357, the other end of which is adjustably attached at 358 to the frame of the machine, so that it tends constantly to raise the free end of the frame. A link 359 is pivoted at one end on shaft 353 and has at its other end a slot 360 receiving a rod 361 across the frame of the machine. Mounted in frame 351 on the upper side thereof and midway between shafts 350 and 353 there is a shaft 362 on which there are pivotally mounted arms 363 carrying rollers 364 which are adapted to rest against the paper in registry with rollers 352 and 354. Rigidly mounted with frame 351 there are brackets 365 between which and arm 363 there are springs 366 normally pressing rollers 365 toward the respective rollers 352 and 354.

Each of the shafts 361 has upwardly extending arms 367. To one of these arms of one of the shafts there is attached a rod 368 on the other end of which there is a head 369 which is provided with a slot 370 for receiving shaft 129 and has rollers 371 and 372 adapted to rest against the surface of cam 373 on shaft 129. Arms 367 at the ends of shafts 361 are connected by strap 334, mentioned above. Rock shaft 361 carries arms 374 adapted to press upon shaft 362 and force frame 351 downward against the tension of spring 357 when shaft 361 is rocked in the appropriate direction.

Pivoted upon strap 334 there are catch members 375, each of which has a lug 376 carrying an adjustable stop screw 377 adapted to contact the upper side of strap 334. See Fig. 23. The lower end of member 375 is provided with a hook 378 adapted to engage in notch 379 or against tooth 380 of member 340. The two members 375 are drawn towards each other by a spring 381 so that they are kept in contact with member 340 until forced out by stop screw 377 contacting the upper side of strap 334. It will be understood that the eccentric 344 operates to put tension on member 340 to switch that member and the connected sleeve 328 and the guide fingers carried thereby first in one direction and then in the other direction. Viewing the parts as shown in Figs. 22 and 23, it will be understood that member 340 will be placed under tension by eccentric 344 tending to switch the fingers so as to guide the paper to the right, whereas the paper is passing to the left with the parts as shown in those views. However, the left member 375 engaging notch 379 in member 340 prevents the movement of 340 and the guide fingers until strap 334 is moved to the left so that stop nut 377 engages the top of strap 334 and forces the hook out of notch 379. Thereupon the tension of spring 349 immediately snaps members 340 to the limit permitted by the engagement of tooth 380 with hook 378. By this same movement of strap 334 right rock shaft 361 is oscillated to depress arms 374 and thereby lower the guide member 351, as will be described later.

It will be readily understood that movement of the guide fingers and the timing of the cutter are so related that the fingers are snapped across the path of the paper at the time a cut comes in line with the ends of the fingers. The leading uncut strips of paper register with the ends of the guiding fingers so that, when the fingers are snapped across the path of the paper, they break off these leading connections, fingers 338 holding the paper above the fingers 336 so that the leading strips are snapped off, thus completing the severance of the portion of the sheet which has been delivered to the mandrel from the oncoming sheet.

By the above described mechanism sheets of paper are slit, creased, pasted and cut and guided to the mandrels alternately.

On shaft 385 of roller 106, driven by chain 232, as previously described, there is a sprocket wheel 386 which drives a chain 387 engaging a sprocket wheel 388 on shaft 389 of roller 250. (See Figs. 3 and 4.) Also mounted on shaft 389 there is a sprocket wheel 390 driving a chain 391 which engages a sprocket wheel 392 on shaft 286. Another sprocket wheel 393 on shaft 389 drives a chain 394 which engages a sprocket 395 on one of shafts 350. The two shafts 350 are provided with meshing gears 396.

As previously described, the pasting devices are geared together, so that they can be driven from shaft 286, and shafts 353 are driven from shafts 350. It will be seen, therefore, that the pasting rolls as well as feeding roll 250 and the rollers on shafts 350 and 353 are driven in timed relation with the pull rolls, and, therefore, any adustment of the speed of the pull rolls is transmitted to the subsequent feeding and guiding means.

The details of the mandrel are shown in Figs. 38 to 45, inclusive. The mandrel is supported from a plate 400 which is attached to suitable driving means as will be explained later. Extending from plate 400 there are arms 401 upon which is mounted the longitudinal supporting member 402 for the mandrel. This supporting member is provided with perforated lugs 403. Broad side plates 404 and 405 are provided for the mandrel, and for convenience in description these will be referred to as the upper and lower plates respectively, they being in that condition when the mandrel is viewed as in the cross-sectional views 39 to 43, inclusive. These plates are provided with pegs 406 and sleeves 407, respectively, which are nested within perforated lugs 403, whereby plates 404 are held in lateral alinement with each other while being permitted to move upward or downward with respect to central member 402.

The right sides of the mandrel plates 404 and 405 are connected by hinge plates 408 and 409 as will more clearly appear from Figs. 39, 40 and 43. Plate 409 carries fingers 410 projecting past the central hinge joint 411, and on the end of each of these fingers 410 there is a pin 412 adjustably mounted in a head 413 by a set screw 414. Plate 408 is provided with perforations through which pins 412 extend when the hinge member is straightened. When the hinge member is bent, as shown in Fig. 43, the pins are withdrawn.

From the central hinge joint 411, there extends inward a bar 415 provided with an adjusting turnbuckle 416. This bar runs through a suitable channel in central supporting member 402 and is provided within said member with an anti-friction roller 417, which works in a cam slot 418 in a cam plate 419. Cam plate 419 is attached to a longitudinal operating rod 420. Bar 415 extends through member 402 and its left end is attached to the middle joint 421 of hinge plates 422, which unite the plates 404 and 405 on that side of the supporting member 402. It will be readily seen that, by means of this construction, movement of the bar 415 to the left, as viewed in Fig. 40, bends the hinges and brings plates 404 and 405 towards each other, since these plates are prevented from moving laterally with respect to the carrier 432 by means of the nested pins and sleeves within bosses 403.

The disclosed mandrel is intended for forming a valve bag, and for this purpose there is provided means for collapsing the mandrel to allow the valved end of the bag to be withdrawn therefrom. Two similar bars 423 are provided, each having a bent end 424 at the end of the mandrel next to supporting plate 400. Arms 425 extend inward from bars 423 and slide in guideways 426 on plates 404 and 405, respectively. Certain of arms 425 are provided with pins 427 extending towards each other from opposite arms and entering through perforations in heads 428. Each of heads 428 is provided with a lateral perforation through which there extends a pin 429 having on one end a wedge shaped head 430 and at the other end an adjusting nut 431. From this pin 429 there extends inwardly a strap 432 which passes through a suitable guide opening in member 402 and has thereon an anti-friction roller 433 which operates in a cam slot 434 in cam plate 419.

It will be readily apparent from an inspection of Fig. 38 that, when cam plate 419 is moved longitudinally to bend the hinge plates and bring plates 404 and 405 towards each other, straps 432 are at the same time moved endwise to draw bars 423 towards the edges of plates 404 and 405. When this happens head 430 is withdrawn, as shown in Fig. 42, so as to allow pins 427 to move towards each other. Upon the opposite movement of cam plate 419, straps 432 are forced outward so that they press against the bevelled ends of pins 427, and in the expanded position of the mandrel hold pins 427 apart, as clearly shown in Fig. 41.

At the end of the mandrel there is an end plate 435 which is mounted upon straps 436 and 437 which slide in keepers 438 on bottom plate 405. At the left of the end of the mandrel there is a corner plate 439 to which are attached rods 440 sliding in guideways 441 on the inner side of plate 435. Connected to straps 436 and 437 there is a plate 442. As most clearly appears from Figs. 36 and 37, plate 435 is mounted on its lower side by means of a hinge joint 443. It is connected by a spring 444 to a pin 445 on strap 437. Projecting downward from plate 404 there is an abutment member 446 against which there normally rides the upper rod 440, keeping the end of plate at right angles to plates 404 and 405 when the mandrel is expanded.

A lever 450 is pivoted at 451 to member 402 and passes through a slot 452 in rod 420. The free end of lever 450 is connected by a tension spring 453 with a pin 454 mounted on member 402. The free end of lever 450 is likewise provided with a slot 455 in which there works a pin 456 on lever 457 fulcrumed at 458 and having its other end connected by a link 459 to strap 436. Lever 450 normally rests against an adjustable stop pin 460 mounted on member 402.

When rod 420 is drawn upward, as viewed in Figs. 38 and 44, it operates cam plate 419 to collapse the mandrel, as previously described, and also moves lever 450, which in turn operates lever 457 so as to thrust strap 436 downward. Straps 436 and 437, being rigidly connected by plate 442, are moved endwise together. Mounted upon strap 436 there is a slidable strap 461 provided with slots 462 through which there project pins 463 on strap 436. Mounted upon plate 405 there is a spring-pressed detent 464 riding against the side of strap 461 and in position to enter a notch 465 in the strap when that is moved outward to a certain extent. Mounted on the end of strap 461 there is a pin 466 which passes through a slot 467 in one arm of a bell crank lever 468 mounted on a projection 469 from plate 442. A spring 470 normally holds the bell crank in the position with respect to the other parts in which it is shown in Fig. 44.

When rod 420 is moved upward as viewed in Figs. 38 and 44, it operates cam plate 419, as previously described, to collapse the mandrel. At the same time it starts the movement of lever 450 to project strap 436. Since strap 437 is rigidly connected to strap 436 by plate 442, these parts are slid endwise on plate 405 as a unit. When this takes place, plate 435 is drawn by spring 444 so as to maintain upper rod 440 against lug 446 until it passes below the end of that lug at about which time a stop lug 475 on the end plate rests on plate 442 and stops the swinging movement of the end plate. There is a member 476 on rod 440 having therein a notch 477. When the end plate is swung down so that lug 475 rests upon plate 442, notch 477 encloses a pin 478 on the end of bell crank lever 468.

Rod 420 is operated until lever 450 and its associated parts assume the position in which they are shown in dotted lines in Fig. 44, at which time strap 436 will be thrust outward far enough so that catch 464 will have entered notch 465. Thereafter rod 420 is given a slight inward movement so as to partially return strap 436. When this occurs strap 461 is held against movement by catch 464 and, because of this, the pin 466 is held stationary and bell crank lever 468 is swung about this pin into the dotted line position in which it is shown in Fig. 44, which results in moving member 476, rod 440 and corner plate 439 to the right. After the bag has been stripped from the mandrel, the movement of rod 420 is continued and lug 479 on strap 436 releases catch 464, so that the bell crank lever 468 is snapped back to its original position by spring 470, and plate 439 is again extended and the other parts of the mandrel are expanded, as will be readily understood clearly, by the reverse movement of cam plate 419.

The mechanism for rotating the mandrels is shown in end view in Fig. 2, and in detail in Figs. 54 to 65, inclusive. Drive plate 400 of the mandrel is attached by means of bolts 500 to a flange 501 on the end of a sleeve 502 which surrounds rod 420. Rod 420 extends completely through sleeve 502 and has a threaded end 503 on which there is rotatably mounted a head 504 pivoted in the upper forked end 505 of a lever 506 which is fulcrumed at 507 on a suitable bracket 508. The lower end of the lever is pivoted at 509 to a rod 510 slidable in the frame and substantially parallel with rod 420 (see Figs. 55, 56 and 57). The other end 511 of rod 420 is threaded and has adjustably mounted thereon a head 512 carrying a roller 513 working in a cam slot 514 in a cam wheel 515 mounted on shaft 600. By this means rod 420 is reciprocated in the manner desired for operating the mandrel.

The operating mechanism for the mandrels is in duplicate, and, therefore, the complete details of but one will be described.

On sleeve 502 there is a worm wheel 516 which meshes with a worm 517 on a sleeve 518 which is keyed on a shaft 519. Between and in alinement with the two shafts 519 which drive the two mandrels, there is a short shaft 520 around which there is mounted a sleeve 521 carrying thereon a sprocket wheel 522 driven by a chain 523 from a sprocket wheel 524 on main drive shaft 206. On each end of sleeve 521 there is a clutch drum 525. Keyed on the end of shaft 519 and within drum 525 there is a clutch member 526. Extending radially of drum 525 there is a drive pin 527 which is half cut away at 528. The end of pin 527 has rigidly mounted thereon an operating head 529. Clutch member 526 has pivoted thereto at 530 a starting wedge 531. A driving block 532 is fastened to clutch member 526 adjacent the free end of starting wedge 531.

An anti-friction roller 535 is mounted on a stem 536 which in turn is mounted in a carrier 537 which is rotatably mounted upon shaft 519. At one end of carrier 537 there is a forked member 538 having therein slots 539. Plate 538 is attached to member 537 by means of bolts 540 through slots 539. Member 538 has extending from one side thereof an arm 541 which is attached to a bar 542 by a bolt and slot connection 543, see Figs. 54 and 59. Between the arms of 538 there is a collar 544 keyed on shaft 519 and internally screw threaded. On this thread there is arranged a collar 545 which is held in adjusted position by a set screw 546. Between collar 545 and member 537 there is a thrust bearing 547 so that member 537 is held by collar 545 in accurately adjusted position towards the clutch members, and in accurately adjusted fixed position about the shaft by member 538.

Mounted beneath bar 542 adjacent the periphery of drum 525 there is a pin 550, the outer end of which is pivoted at 551, to a bell crank lever 552 fulcrumed on the frame at 553. A spring 554 thrusts pin 550 inward towards the drum as far as it is permitted by a rod 555 attached to the bell crank lever at one end and to a head 556 at the other end. Head 556 straddles a cam shaft 557 which has thereon a cam 558 with a notch 559. A lug 560 on head 556 normally rests against the periphery of cam disk 558 but periodically enters notch 559 to permit the temporary inward movement of pin 550.

Operating head 529 is provided with a central lug 561 and two operating arms 562 and 563. A compression spring 564 between lug 561 and a pin 565 in drum 525 maintains head 529 oscillated in either direction in which it is turned by its arms, the oscillation being limited by a pin 566, as clearly appears from diagrammatic Figures 63, 64 and 65.

On the opposite side of the frame from pin 550 there is a similar pin 567 operated by a bell crank lever 568 through a rod 569 attached to a head 570 straddling shaft 557 and having a lug 571 thereon adapted at suitable intervals to enter a notch 572 in a cam disk 573 on shaft 557. Shaft 557 has thereon a spiral gear 574 meshing with a spiral gear 575 on a drive shaft 576. By this means the pins 551 and 567 are projected at the desired intervals into the path of operating arms 562 and 563, respectively.

When the head 529 is in the position in which it is illustrated in diagrammatic view 63, the clutch is open, as notch 528 allows pin 527 to pass by both starting wedge 531 and driving lug 532. When the clutch is to be closed and the mandrel to start, pin 550 is thrust into the path of arm 562. When the arm comes in contact with the pin, the head is oscillated so as to turn it from the position in which it is shown in Fig. 63 to that in which it is shown in Fig. 64. Thereupon notch 528 no longer registers with the starting wedge 531 but rides against the slanting face thereof when the clutch is turned so the face is encountered. This brings pressure to bear, moving the wedge and consequently member 526 forward in the direction of travel of drum 525. However, during this initial movement, the outer slanting face of wedge 531 rides past roller 535 and, therefore, allows the wedge to move away from disk 525. Accordingly, pin 527 rides along wedge 531 at the same time that the wedge is moving forward and swinging outward as permitted by roller 535. The faces of the wedge are so shaped that the speed of member 526 is gradually increased as pin 527 approaches the end of the wedge member, so that it has nearly reached synchronous speed with member 525 by the time pin 527 encounters drive block 532. Thereafter, the two members 526 and 525 move in unison until the clutch is opened. The opening of the clutch is accomplished by thrusting pin 567 into the path of arm 563, which once more swings the head into the position in which it is shown in Fig. 63, so that it slips past lug 532 and, upon the next revolution of drum 525 relative to member 526, notch 528 registers with both the wedge and block, so that the clutch continues open until pin 550 is again operated.

Arms 562 and 563 are provided with faces 577 and 578 which ride against pin 550 or 567, respectively, and hold the head in turned position long enough to prevent rebound thereof, which may otherwise occur during high speed operation.

Rotatably mounted toward the outer end of shaft 519 there is a disk 580, which is connected by a torsion spring 581 with a collar 582 fixed upon the outer end of the shaft. Disk 580 is provided with a projection 583. A stop latch 584 is pivoted to the frame at 585 and is normally held by a spring 586 downward against the periphery of disk 580. However, a rod 587 pivoted to member 584 is connected at its other end to a head 588 straddling cam shaft 557 and having thereon a lug 589 resting upon the periphery of a cam 590 upon shaft 557. When lug 589 drops into depressed portion 591 of cam 590, member 584 is allowed to descend into the path of projection 583, and thereupon stops the rotation of disk 580. This applies resistance through torsion spring 581 against further rotation of shaft 519, and thereby stops the rotation of sleeve 502.

On sleeve 502 there is a disk 592 on which there rides a pawl 593, as most clearly shown in Fig. 55. Pawl 593 is held in contact with the perforated disk by spring 594 and enters notch 595 in the edge of disk 592 at each revolution thereof. The parts are so adjusted that the momentum of the mandrel and associated parts turns disk 592 to carry notch 595 slightly beyond the end of pawl 593 before the revolution of the mandrel is stopped by torsion spring 581. Spring 581 will then be under sufficient torque to turn disk 592 firmly back against pawl 594. In this way the mandrel and likewise shaft 519 are stopped each time in exactly the desired position, since if the momentum carries them slightly beyond this position they are returned thereto by spring 581.

By the above described mechanism the paper is fed to the mandrels alternately, and the mandrels are operated. There will be described next the mechanism co-operating with the mandrel, during and subsequent to winding, to fold the paper into bag form and remove the bag from the mandrel.

Mounted in the frame beneath the mandrels and transversely thereof, is a shaft 600 driven from shaft 601, as will be described later, in synchronism with shaft 129. Above shaft 600 at its left end, as viewed in Fig. 1, is shaft 601, while above its right end is shaft 602. Shafts 601 and 602 are in vertical planes adjacent the distant edges of the two mandrels.

Above shaft 600 and in a plane midway between the adjacent edges of the mandrels there is an extension of shaft 576 which operates creasers in connection with the two mandrels alternately. Upon each of shafts 576, 601 and 602 there is a spiral gear 603 meshing with a similar gear 604 on shaft 600, so that shafts 576, 601 and 602 turn synchronously with shaft 600 and shaft 129.

Shafts 576 and 602 carry cams 605 against which there run cam rollers 606 on the ends of levers 607 pivoted at 608 on the frame. In the upper ends each pair of levers 607 there are adjustably mounted brackets 609 for a shaft 610. The shaft may be in the form of a roller having circumferential grooves 611 therein, or may have a plurality of sleeves attached thereto and spaced longitudinally to produce the same effect. Shaft or roller 610 swings beneath fingers 612 which project downward from frame 351 in close proximity to the path of the corners of the rotating mandrel. A spring 613 urges the arms toward the mandrel, and keeps rollers 606 against cams 605 except when prevented by contact of roller or shaft 610 with the paper on the mandrel.

Mounted adjacent each edge of each mandrel, when they are in horizontal position, are brackets 615 slidably supporting horizontal rods 616. Attached to these rods are creasing plates 617. Shafts 601 and 602 each carries a cam 618 against which there rides a roller 619 on a slotted head 620 straddling the respective shaft. The other end of head 620 is pivoted to a lever 621 fulcrumed on rod 608 and having a fork 622 at its upper end engaging a pin 623 on the support of plate 617.

On the end of each rod 616 distant from the mandrel there is a collar 624 between which and bracket 615 there is a spring 625, which pulls the rod away from the mandrel and keeps roller 619 against roller 618, so that plate 617 is held away from the mandrel except when roller 619 rides up on projection 624 of the cam, whereupon the creasing plate is forced towards the mandrel.

Shaft 576 carries a double cam 625, with a head 626 and roller 627 working against one side and a head 628 and roller 629 working against the other side, roller 627 being in position to ride up projection 630 and into depression 631 which roller 629 rides into depression 632 and up projection 633. The heads are pivoted to arms 634 and 635 of a lever 636 fulcrumed on the central rod 608, and having a forked upper 637 straddling a pin 638 on the carriage 639 for the creasing plates 617 for the adjacent sides of the two mandrels. As will be seen, these plates are held by the circular portions of cam 625 midway between the mandrels. When roller 627 rides up projection 630 and roller 629 rides into depression 632, as shown on Fig. 31, left plate 617 is forced to the left to the position in which it is shown in Fig. 31, where it creases the gusset fold of a bag, indicated by dotted lines 640. At the same time the left plate 617 is operated to crease the left side of the bag by the left cam 605. When roller 629 rides up on projection 633, carriage 639 is shifted from its neutral position to the right, and creases the bag on the right mandrel at the same time the right cam 605 is operating the right plate 617 to crease the other side of the bag.

Mounted beneath and parallel with each mandrel there is a sleeve 640 carrying an arm 642 upon the upper end of which there is pivotally mounted a wiping device 643 in position to wipe past the delivery end of the mandrel and fold the flaps successively against the mandrel end so as to form a bottom for the bag. Sleeve 640 is oscillated by a gear 644 engaging a vertical rack 645 which is reciprocated by a head 646 straddling mandrel-carrying sleeve 502 and bearing a roller 647 working in a cam groove 648 and cam 649 on said sleeve. See detail Fig. 46.

Extending through sleeve 640 there is a shaft 650 having on its end below sleeve 502 a sprocket wheel 651 connected by a chain 652 with a sprocket wheel 653 on sleeve 502. See Fig. 58. The other end of shaft 650 carries a sprocket wheel 654 connected by a chain 655 with a sprocket wheel 656 on the shaft 657 carrying wiper 643. The wiping device comprises a plate 658, adapted to wipe against the flaps on the short side of the mandrel, and a long plate 659 adapted to wipe against the long sides of the mandrel, and is yieldingly mounted by means of an interposed spring 660. Cam groove 648 is shaped so as to move the wiping device across the line of the mandrel end and fold down each flap in succession, while shaft 657 is turned in timed relation so as to bring the wipers against the successive flaps in proper relation thereto. When the mandrel is brought to rest after a bag has been wound thereon, the wiper is in the position in which it is shown in Fig. 46, and so does not interfere with the removal of the bag from the mandrel, mechanism for which will be described next.

The bag-removing devices for the two mandrels being identical, but one will be described. There is a lower carrying-off roller 665 with its upper side substantially in the plane of the lower side of the mandrel when the mandrel is at rest. The shaft 666 of roller 665 carries a bevel gear 667 in mesh with a gear 668 on a shaft 669 having on its other end a sprocket wheel 671 which is driven by a chain 672 from a sprocket wheel 673 on shaft 203.

Slidably mounted above roller 665 there is a mating roller 675 driven synchronously with roller 665 by a gear train 676, shown in detail in Fig. 36. The ends of shaft 677 of roller 675 are carried by links 678 in slideways 679. Each link 678 is provided with a slot 680, and shaft 681 passes through these slots. Cams 682 on shaft 681 support rollers 683 on the upper ends of links 678, so that the vertical position of roller 675 is determined by cams 682.

Shaft 681 is driven by a bevel gear 684 meshing with a bevel gear 685 on a vertical shaft 686 which in turn is driven by a bevel gear 687 on its lower end meshing with a bevel gear 688 on shaft 602, and accordingly cam shaft 681 is driven in synchronism with cam shafts 576, 601 and 602.

Above the bag, as it is being discharged, there is a bottom folder and creaser plate 690, which is carried by arms 691 pivoted at 692 on the frame and controlled in position by integral arms 693 carrying rollers 694 working against cams 695 on shaft 681. A spring 696 is attached to each arm 691 and snaps the folding plate downward whenever permitted by cams 695. Springs 697 aid gravity in moving roller 675 downward, when permitted by cams 682. Plate 690 is mounted adjustably on arms 691 by bolts 698 passing through slots 699 in the arms.

The cams on shaft 681 are so timed that roller 675 is raised when the end plates 435 are pushed out as previously described and as shown in Fig. 36. Just as plate 435 reaches its outward limit of movement, plate 690 is snapped down to the position in which it is shown in Fig. 37, where it creases the wall 700 of bag 701 adjacent the end 702 thereof. Immediately thereafter roller 675 is lowered so as to pinch the end of the bag and strip it from the mandrel and at the same time complete the folding started by plates 617 and 690.

The apparatus is shown as adapted to make a valve bag. For the purpose the corner of the bag is tucked in as it is being collapsed. To allow this tucking, 423 are slanted at 424, as previously described. A tucking finger 710 (see Figs. 27 to 32) is pivoted at 711, adjacent the position of this corner of the bag when the mandrel is at rest. On the bottom end of the downwardly extended pivot rod 711 of the finger there is a gear 712 meshing with an arcuate rack 713 pivoted on the frame at 714, and drawn by a spring 715 towards the position in which it is shown at the left of Fig. 32. Rack 713 carries on its underside a cam roller 716 normally resting against the face of a cam 717 on shaft 601 or 576, as the case may be, and holding the rack and finger in the position in which they are shown in the middle of Fig. 36. When roller 716 rides into a depression in the cam, spring 715 snaps the finger into the position in which it is shown in Figs. 27 and 28 and at the left of Fig. 36, thereby tucking in the corner of the bag to form a valve.

The end of plate 617 adjacent the valve corner of the bag may be forked at 704 to aid in the valving operation, as shown in Figs. 29 and 30.

The pasting device comprising roller 314 and its operating mechanism, previously described, applies paste to the outside of the paper which forms the outer ply at the valve corner of bag. A sheet of paper for valve-reinforcing or extending or for sleeve forming or other purposes may be placed upon the finger 710 and carried by it into position in the valve, where it is held by the previously applied adhesive.

The withdrawal of the bars 423 and corner plate 439, as previously described, allows the bag to be stripped from the mandrel without disturbing the tucked-in valve corner, and the valve folds, as well as the other folds of the bag, are compressed by the discharge rollers 665 and 675. Thereafter the valve end of the bag may be closed in any desired way.

If no extra sheet is desired at the valve corner of the bag, paste roller 314 and its driving mechanism may be omitted; and if no valve is desired, or if it is preferred to form the valve in connection with the closing of the bag at the valve end, the tucking finger may be omitted, and bars 423 and corner plates 439 may be rigidly supported on the plates 404, 405 and 435 respectively, and the operating mechanism for withdrawing these members may be omitted, thus simplifying the construction of the mandrel.

If preferred, the paste mechanism operating paste bar 287 for applying cross strips of paste to the paper may be omitted, and there may be substituted the construction shown in Figs. 52 and 53. A bracket 720 is supported on frame members 721 and 722, and a bracket 723 on frame member 724 supports arm 725 extending from bracket 720. On arm 725 there is a paste holder 726 in which there runs a roller 727. Adjacent roller 727 there is shaft 728 on which there is mounted a bar 729 urged outward by springs 730. The shaft 731 of roller 727 carries a gear 732 meshing with a gear 733 on shaft 728. Gear 733 is carried directly by a sleeve which runs loosely on shaft 728 and also carries a gear 734, meshing with a gear 735 on the end of a shaft 736, which may be driven from shaft 576 or from any other suitable source in timed relation with the driving mechanism of the mandrel.

Slidably mounted upon shaft 728 adjacent the face of gear 733 there is a clutch member 737 which is operated to and from gear 733, to free the gear or connect it to shaft 728, by means of a bell crank lever 738 operated by a rod 739 from a cam on shaft 576, or upon any other suitably driven shaft, so that it makes one revolution for each two bags.

It will be readily understood that core 111 is turned past the paste device from the full line position in which it is shown in Fig. 52 to the dotted line position shown in that figure. Bar 729 contacts the paper on the side of the mandrel and applies a strip of paste from end to end of the mandrel. The parts are timed so that the paste will be applied at least once between the successive plies, the clutch member 737 being moved away from gear 733 when the paste bar 729 should not be operated to apply paste. If desired, the gearing may be so designed that the paste will be applied along the same line between the successive plies, or it may be designed so that the bar makes a turn in a trifle different time from that required for one turn of the mandrel so that successive strips of paste may be applied in stepped relation, if preferred.

An alternative construction for folding the end flaps into position is shown in Figs. 47 to 51, inclusive. In these figures there is shown a wiper shaft 740 adjacent the end of each mandrel. The ends of the shaft are mounted in slides 741 which are vertically movable in the frame and are provided with rollers 742 which rest upon cams 743 carried by a shaft 744 driven in timed relation with shaft 600.

On the end of shaft 740 there is a gear 745 meshing with a gear 746 on a vertical shaft 747, the lower end of which carries a slidable gear 748 keyed thereon and meshing with a gear 749 on a shaft 750 driven in any suitable manner in timed relation with the rotation of the mandrel and making two revolutions for one revolution of the mandrel.

Pinned upon shaft 740 there is a collar 751, and between collar 751 and gear 745 there is a torsion spring 752. Coilar 751 carries a lug 753 in position to encounter a stop 754 mounted upon a sleeve 755. Sleeve 755 also carries an arm 756 adapted to be lifted at suitable intervals by a lug 757 on the hub of gear 745. These parts are so related that during the turning of shaft 740 lug 753 encounters stop 754 and stops the turning of the shaft. Gear 745 continues to turn and apply torsion to shaft 740 through spring 752 until lug 757 lifts arm 756, whereupon stop 754 is moved out of the path of lug 753 so that shaft 740 is allowed to turn under the influence of spring 752. Before it has completed one turn, lug 753 will move far enough to allow arm 756 to return to normal position and thereby return stop 752 to the path of lug 753, so that the shaft makes one quick revolution under the influence of spring 752 and then is stopped until gear 745 has completed its revolution.

Shaft 740 carries a brush 758, and the movement of the shaft is timed so that the brush sweeps upward against and past the end of the mandrel just as the mandrel is brought to the horizontal position in which it is shown in Fig. 47. This folds upward the flap extending from the broad side of the mandrel.

Also mounted adjacent the end of the mandrel on frame 724, there is a bracket 760 which carries shafts 761 and 762. Shaft 761 carries a sprocket wheel 763 connected by a chain 764 with a sprocket wheel 765 on shaft 750. Shaft 761 also carries a gear 766 meshing with a gear 767 which is loose on shaft 762. Shaft 762 also carries a collar 768 having a wiping arm 769 and a lug 770 extending therefrom. A torsion spring 771 is connected to gear 767 and collar 768. A trip lever 772 has an end 773 normally resting against collar 768 in the path of projection 770, being held in that position by a spring 774. A pin 775 on gear 766 contacts a lug 776 on lever 772 once during each revolution. The parts are so related that spring 771 applies torsion to collar 768 until the right edge of the mandrel 111, as viewed in Fig. 47, is lowered about the width of the mandrel into operative relation with wiper 769, whereupon pin 775 encounters lug 776 and moves trip lever 773 out of the path of projection 770, and the spring is allowed to sweep wiper 769 across the edge of the mandrel, folding into place the flap projecting from the paper on the narrow edge of the mandrel. Before the wiper has completed a revolution, pin 775 passes projection 776, so that projection 770 encounters trip lever 773 at the end of the revolution of the wiper, and the wiper is stopped until the next flap is in position for folding operation.

It will be seen that wiper 769 is located beneath the path of the bag while it is being discharged from the mandrel, and that slides 740 are moved vertically downward so as to leave a clear path for the discharge of the bag after all the flaps on the end of the bag have been wiped into place.

In the form of construction previously described the paper is pressed against the edge of the mandrel by the rollers 610, the grooves 611 of which register with pins 612, of the mandrel, so that the leading edge of the paper is pressed onto those pins and held in place during the first wrap around the mandrel. It will be readily understood that the roller contacts the narrow side of the mandrel and rolls around each one of the four corners of the mandrel in succession, so as to lay the paper smoothly onto the mandrel.

In the construction shown in Figs. 47 and 48 there are spring fingers which may be used in substitution for or in addition to the rollers just described. These fingers 780 are provided with slots 781 which register with the pins on the mandrel. The fingers 612 in connection with the mandrel at the right, as viewed in end views like Fig. 47, swing upward and outward from the mandrel. To these fingers there is attached a bar 783 which carries fingers 780. However, the fingers 612 in connection with the mandrel at the left, as viewed in Fig. 47, swing upward and towards the mandrel, and, therefore, in this connection finger-carrying bar 783 is attached to frame piece 724 and other suitable portions of the frame.

The operation of the device will be fairly clear from the foregoing detailed description, in connection with which the operation of the several parts have been described in most instances. However, for convenience the operation of the entire device will be summarized, particularly in connection with the diagrammatic illustrations in Figs. 66 to 72 inclusive.

As previously indicated, a sheet of paper 100 is continuously supplied, and pull rolls 103 and 104 move it under roller 101 and past the slitting device 102. At this point two slits 785 and 786 are made in the edge of the paper for every revolution of the slitters, and these slits provide between them narrow flaps 787, while between each successive pair of slits, or between each successive pair of flaps 787, there is a comparatively long flap 786. These slits are substantially the depth of the overhang of the paper beyond the end of the mandrel, but are preferably somewhat shorter than the depth of this overhang so as to avoid any danger of leaving openings at the corners of the bag.

As previously described, the slitters are operated so as to bring the slits substantially in registration with the successive corners of the mandrel, and to continue to do this in spite of the increasing diameter of the mandrel and paper thereon during the winding of a bag. However, the slitter operating cam may be modified, if preferred, so that the slits will not come in exact registration, but the successive ends of flaps may be slightly staggered when folded into position, if that construction in the finished bag is preferred.

After passing through the slitter, the paper is pulled through rolls 103 and 104, and creasing disk 225 presses the overhanging flaps downward against the end of roller 104, thereby creasing the paper along the line where it will register with the end of the mandrel. These flaps are returned to their normal position with respect to the sheet when they encounter roller 106, but the crease remains at the base of each flap and facilitates the subsequent folding of the flaps into position.

The paper next passes through the cutting device 107, where the paper is severed by knife 241 along line 789 in registration with one of the slits 786, so that the paper is cut square across except for the leading strips previously described. The offset ends of the cutting knives form a slit 790 a trifle farther along than the line 789, leaving a short flap 791 between slit 786 and slit 790. The speeding up operation of the paper driving mechanism, through the operation of pawl 155, takes place just after slit 786 along the line where the paper is to be cut, as at 789, first passes the slitting device, so that the next pair of slits 785 and 786 are properly spaced from slit 790 to leave a flap 788 therebetween of a length to fit against the broad side of the mandrel.

After the paper passes cutting device 107, it is moved downward past the pasting device. As previously described, roller 250 carries pasting projections which apply paste around the outline of each flap, that is, a line of paste is applied continuously along the edge of the paper and along each slit 785 and 786, except where the flaps are to be folded against the end of the mandrel. In the example shown, the flaps are of a length nearly but not quite equal to the width of the narrow edge of the mandrel, so that each of the broad flaps 786 substantially covers the end of the mandrel. If the end of the mandrel is covered by the first flap 786 folded against said end, it will be readily apparent that all subsequent flaps may be pasted. However, if the flaps are not long enough to completely cover the end of the mandrel, the first two flaps 788 may be left unpasted, and the pasting be begun only with the next flap. It will be readily understood that short flap 791 is always left unpasted.

In the construction shown, bar 287 rotates twice for each rotation of the mandrel, but fingers 322 operate to prevent the application of paste to the paper by bar 287 on every other revolution, so that a strip of paste is applied across the paper once for every revolution of the mandrel.

From the pasting device, the paper moves downward and past switch fingers 336, and through guiding devices 110 to the edge of the mandrel 111. As the cut end of the paper is moving downward to the edge of the mandrel, guide frame 351 is depressed by arms 374 in the manner previously described, so that fingers 612 are in close proximity to the edge of the mandrel. The mandrel is turning at the speed of movement of the paper when the cut edge of the paper arrives at the edge of the mandrel, as will be described more fully later. In this way the spears 412 of the mandrel encounter and perforate the paper with a turning movement, rollers 610 or fingers 780 insuring that the paper is pressed against the spears sufficiently to perforate the paper and is thereby secured in position on the mandrel for the subsequent turning movement.

Immediately after the paper has been secured to the edge of the mandrel, arms 374 release the guide frame 351 and allow springs 357 to raise the guide frame, thus insuring even tension upon the paper as it is wound about the mandrel.

During this winding, each successive flap is folded up against the end of the mandrel and is held in position by the adhesive on its inner side until a successive flap is folded thereagainst. In this way, a bag bottom is formed of the interleaved flaps.

Thereafter the mandrel is collapsed, and if a valve bag is to be formed, the valve is tucked in during this collapsing operation. Then the bars at the valve side of the bag are withdrawn and the bottom of the bag is shoved toward the delivery rolls, at the same time having its top slanted away from the rolls. Member 690 comes down and creases the upper wall of the bag, so that the bottom folds upward evenly against the top side of the bag, as the bag is delivered to, and passed through the delivering rolls.

The operation of the mandrels with relation to each other will be most clearly understood from a consideration of Figs. 68 to 71 inclusive. For convenience, in referring to these figures, the mandrel on the left will be referred to by reference numeral 793 and the mandrel at the right by 794. Beginning with the position shown in Fig. 68, it will be seen that there is paper long enough to go one and one half times around the mandrel 793 before the end cut 789 is reached. At this time mandrel 794 begins to turn as a result of the closing of the mandrel turning clutch, so that pin 527 encounters starting wedge 531. As previously described, the acceleration due to the shaping of starting wedge 531 is gradual, and by the time mandrel 793 has made a half turn, as shown in Fig. 69, mandrel 794 will have made less than ¼ of a turn. However, the continued acceleration of mandrel 794 speeds it up so that, by the time mandrel 793 has made another half turn as shown in Fig. 70, mandrel 794 has completed its first half turn and has reached substantially synchronous speed with mandrel 793, and pin 527 encounters stop 532, so that the speed of the two mandrels is subsequently synchronous. For that reason, it will be readily understood that, when the end of the paper reaches mandrel 794 as indicated in Fig. 71, the mandrel will be moving at substantially the speed of the paper. The downward movement of guide frame 351 by arm 374, as previously described, takes place at this time and aids in dropping end 789 far enough so that slit 790 will come in registration with the corner of the mandrel.

The clutch operating mandrel 793 continues closed from the position shown in Fig. 71 until the mandrel has made another half turn, during which time the last flaps are folded into position against the end of the mandrel. At that point the clutch is opened, and the momentum of the mandrel continues to move it through another half turn, during which time it is gradually stopped, being finally brought to rest one full turn after the last of the paper has been wound thereon, so that it is in the same position at the end of the winding as at the beginning.

In order to insure the strength of the full number of plies it is necessary to have the ends of successive turns united by adhesive, otherwise, if the inner end and outer end only were united by adhesive to the adjacent plies, the inner ply might break just below the inner end of the adhesive 795, as shown in Fig. 72, while the outer ply might break just beyond the outer line of adhesive 796, as shown in that figure, and in that way only two additional plies would have to break to entirely burst the bag. However, with the inner strips of adhesive 797, 798 and 799 interposed, one for each ply, it will be readily understood that there is no way in which the bag can burst without rupturing all five plies.

This might be accomplished by having the successive strips of paste superposed one above the other so that, as viewed in Fig. 72, they would be in the same horizontal plane. However, it is preferable to step the successive strips upward, both to avoid a stiff thickened seam along the bag and to make sure that none of the strips are accidentally placed lower than the preceding one, so as to make a place where the rupture of the bag may be accomplished by tearing one less than the full number of plies.

In order to accomplish this stepping of paste strips 95 to 99 inclusive, it is necessary for bar 787 to place adhesive on the paper at distances somewhat greater than one round of the mandrel apart. Correct registration of the paste applied by roll 250 requires the strips along the edges of successive plies to come at the corners of the mandrel, and, therefore, to continuously arrive at the corresponding point at each successive turn of the mandrel. It appears therefore that ideal spacing of the two paste-applying devices is somewhat different. This may be taken care of by applying the paste along slightly wider lines than would be strictly necessary, except for this slightly different spacing of the two pasting devices.

However, to avoid any difficulty in this respect, the alternative construction for applying strips of paste 95 to 99, inclusive, may be adopted, this alternative construction being shown in Figs. 52 and 53, or other arrangements may be made whereby the two pasting devices are separately governed.

While the most accurate spacing of the paste applied by roller 250 requires the movement of the pasting device to vary distances between application of the paste as the plies build up upon the mandrel and, therefore, the distance slightly increases, it will be understood that this also may be taken care of by making the application of paste along the flap-dividing slits somewhat broader than otherwise necessary, so that the movement of roller 250 in the direction of the movement of the paper may be avoided at the expense of these broader strips of adhesive.

It will be readily understood that, while a complete apparatus has been disclosed for forming valve bags, there may be omission of various devices not desired, such as omission of the valve features previously suggested, and the omission of various other features of construction where not desired for the particular bags which are to be formed. It will be further understood that various modifications in the mechanical movements for producing the different results may be readily designed, and that various other changes, modifications and omissions or additions may be made within the scope of the appended claims.

What I claim is:

1. In tube winding apparatus, a mandrel angular in cross-section, means to feed a sheet to the mandrel with one edge of the sheet overhanging one end of the mandrel, and means to slit the overhanging edge of the sheet on lines substantially registering with the extended corner lines of the mandrel.

2. In tube winding apparatus, a rotatable mandrel, means to feed to the mandrel a sheet of material long enough to wind a plurality of times around the mandrel, means to form a plurality of slits in one edge of the sheet as it approaches the mandrel, and means to space the slits farther apart in the outer turns of the sheet than in the inner turns, so that the slits substantially register when the sheet is wound on the mandrel.

3. In tube winding apparatus, a rotatable mandrel angular in cross-section, means to feed a sheet of material to the mandrel with one edge of the sheet overhanging one end of the mandrel, means to slit the overhanging edge of the sheet, before it reaches the mandrel, in lines which substantially register with the extended corner lines of the mandrel, and means to fold the successive overhanging portions between slits against the end of the mandrel as the sheet is wound thereon.

4. In tube winding apparatus, a rotatable mandrel angular in cross-section, means to feed a sheet of material to the mandrel with one edge of the sheet overhanging one end of the mandrel and a rotatable slitter in the path of said overhanging edge of the sheet before it reaches the mandrel, means rotating the slitter and mandrel in timed relation, said slitter being provided with knives spaced peripherally of the slitter distances corresponding with the distances between successive corners of the mandrel.

5. In tube winding apparatus, a rotatable mandrel angular in cross-section, means to feed a sheet of material to the mandrel with one edge of the sheet overhanging one end of the mandrel and a rotatable slitter in the path of said overhanging edge of the sheet before it reaches the mandrel, means rotating the slitter and mandrel in timed relation, said slitter being provided with knives spaced peripherally of the slitter distances corresponding with the distances between successive corners of the mandrel, and means for moving the slitter at an accelerating rate away from the mandrel while it is slitting the edge of the sheet, whereby the slits of successive plies wound on the mandrel substantially register.

6. In tube winding apparatus, a mandrel rectangular in cross-section, means to feed a sheet to the mandrel with one edge of the sheet overhanging one end of the mandrel, and a rotatable slitter in position to slit said overhanging edge before it reaches the mandrel, said slitter comprising two knives spaced peripherally distances corresponding to the narrow and broad sides of said mandrel.

7. In tube winding apparatus, a mandrel rectangular in cross-section, means to feed a sheet to the mandrel with one edge of the sheet overhanging one end of the mandrel, a rotatable slitter in position to slit said overhanging edge before it reaches the mandrel, said slitter comprising two knives spaced peripherally distances corresponding to the narrow and broad sides of said mandrel, means to rotate the slitter twice while the mandrel rotates once, and means to move the slitter away from the mandrel while slitting the edge of the sheet at a rate to compensate for the increasing circumference of the mandrel as the paper is built up thereon.

8. In bag making apparatus, a rotatable mandrel angular in cross-section, means for winding a sheet of paper thereon with one edge of the paper overhanging one end of the mandrel, means for creasing the paper, as it moves towards the mandrel, along a line which will register with the end of the mandrel, and means to fold the overhanging portion along said creased line against the end of the mandrel in successive lengths substantially equal to the successive sides of the mandrel.

9. In bag forming apparatus, a mandrel angular in cross-section, means to feed a sheet to the mandrel with one edge of the sheet overhanging one end of the mandrel, means to slit the overhanging edge of the sheet on lines substantially registering with the extended corner lines of the mandrel, means to crease the sheet on a line substantially registering with the end of the mandrel, and means to fold successive flaps between the successive slits against the end of the mandrel.

10. In bag making apparatus, means for winding a sheet into a multi-ply tube, means for applying paste to successive portions of one end of the sheet as it is being wound, means to fold successive pasted portions into overlapping bag-closing relation while the sheet is being wound, and means to move the paste-applying means with respect to the direction of movement of the sheet to compensate for the increasing length of successive turns about the mandrel and keep the paste lines in superposed relation.

11. In bag making apparatus, a mandrel angular in cross-section, means for feeding a sheet of paper to the mandrel and winding it thereabout with one edge overhanging one end of the mandrel, means for applying paste to the overhanging sheet along lines substantially registering with the corners of the mandrel, means for regulating the spacing of the paste to compensate for the increasing distance around the mandrel as the paper is wound thereon, and means to fold the edge of the paper between successive corners successively against the end of the mandrel while the paper is being wound.

12. In tube winding apparatus, a mandrel angular in cross-section, means to feed a sheet to the mandrel with one edge of the sheet overhanging one end of the mandrel, means to slit the overhanging edge of the sheet on lines substantially registering with the corner lines of the mandrel, means for applying paste along the edge of the overhanging portion of the sheet and along said slits, and means for moving the slitting means and paste-applying means with respect to the travel of the paper to compensate for the growing distance around the mandrel as the paper is wound thereon.

13. In tube winding apparatus, a mandrel angular in cross-section, means to feed a sheet to the mandrel with one edge of the sheet overhanging one end of the mandrel, means to slit the overhanging edge of the sheet on lines substantially registering with the corner lines of the mandrel, and means to cut across the sheet in line with one of said slits.

14. In tube winding apparatus, a mandrel angular in cross-section, means to feed a sheet to the mandrel with one edge of the sheet overhanging one end of the mandrel and wind the sheet a plurality of times around the mandrel, means to slit the overhanging edge of the sheet on lines substantially registering with the corner lines of the mandrel, means to move the slitting means to compensate for the increasing distance around the mandrel as the paper is wound thereon, and means for cutting across the width of the sheet in registration with one of said slits.

15. In tube winding apparatus, a mandrel angular in cross-section, means to feed a sheet to the mandrel with one edge of the sheet overhanging one end of the mandrel, means to slit the overhanging edge of the sheet on lines substantially registering with the corner lines of the mandrel, means to wind the sheet a plurality of times about the mandrel, means to increase the speed of the feeding means at intervals, means to cut across the sheet in registration with the slit last made by the slitting means before the temporary speeding up of the paper, and a cutting means adapted to form a slit spaced from the cut-off end of the paper a distance equal to the excess movement of the paper due to said speeding up.

16. In tube winding apparatus comprising mandrels, means to feed a sheet continuously towards the mandrels, means for cutting across the sheet except for leading connections, and means for snapping the leading connections and guiding the completely severed end towards the other mandrel from that towards which the sheet was previously guided.

17. Apparatus for forming tubes, comprising two mandrels, means to feed a sheet continuously towards said mandrels and wind the end thereof alternately on first one mandrel and then on the other, means for cutting across the sheet except for leading connections, a pasting device interposed between said cutting means and mandrels, severing and guiding fingers interposed between the pasting device and the mandrels, and means for operating said severing and guiding fingers in timed relation with the feeding and cutting means to snap off the leading connections and guide the on-coming severed end to the other mandrel from that towards which the sheet has been guided.

18. Apparatus in accordance with claim 17 and comprising means for moving the pasting device away from the mandrels during the feeding of a length of paper therethrough, whereby the pasting device is moved to compensate for the increasing diameter of the tube.

19. In tube winding apparatus, two mandrels, means to feed a sheet of paper towards the mandrels, means to cut across the sheet of paper, means to guide the cut end to the other mandrel from that towards which the sheet was previously fed, means for turning the mandrels to wind a sheet thereon, said cutter and mandrels being timed so that each cut length forms a plurality of plies around the mandrel, and means for speeding up the movement of the feeding means once for each operation of the cutter to insure a length slightly greater than an even number of plies about a mandrel.

20. In tube winding apparatus, two mandrels, means to feed a sheet of paper towards the mandrels, means to cut across the sheet of paper, means to guide the cut end to the other mandrel from that towards which the sheet was previously fed, means for turning the mandrels to wind a sheet thereon, said cutter and mandrels being timed so that each cut length forms a plurality of plies around the mandrel, and manual means for adjusting the speed of the feeding means with respect to the rotation of the mandrel.

21. Apparatus for forming tubes, comprising two mandrels angular in cross section, means to feed a sheet of paper continuously towards the mandrels, means to wind the paper on a mandrel with one edge of the paper overhanging one end of the mandrel, means to slit the paper on lines registering with the corners of the mandrel, means to cut across the sheet, and means to guide the on-coming end to the other mandrel from that on which the sheet has just been wound.

22. Apparatus as set forth in claim 21 and comprising means for speeding up the feeding means once for each operation of the cutter to increase the distance between two successive slits adjacent the cut to provide for slightly more than an even number of turns about the mandrel.

23. In tube forming apparatus, a mandrel, means to feed a sheet of paper towards the mandrel, means to guide a sheet to the mandrel comprising an oscillatable guide, means to depress the end of said guide next to the mandrel as the end of the sheet comes into contact with the mandrel, and yielding means tending to move the free end of said guide away from the mandrel.

24. In tube forming apparatus, two mandrels, means for feeding a sheet continuously towards the mandrels, means for cutting the sheet into lengths as it is fed to the mandrels, means for guiding successive lengths to alternate mandrels, means for rotating the mandrels in timed relation and winding the paper thereabout, an oscillatable final guide guiding the on-coming end of a length to a mandrel, means for oscillating the guide to move its free end nearer the mandrel as the on-coming end of the length approaches the mandrel, means for securing the end of the length to the mandrel, and yielding means tending to move said guide away from the mandrel after the end of the length has been secured to the mandrel, and thereby place the sheet under tension.

25. In bag making apparatus, two mandrels, means for feeding a continuous sheet towards the mandrels, means for cutting the sheet into successive lengths, means for guiding the lengths alternately first to one mandrel and then to the other, means in connection with each mandrel for winding a length thereon and simultaneously folding one end of the tube thus formed to close an end of the tube and make a bag, and means for removing a bag from each mandrel while a length is being formed into a bag on the other mandrel.

26. In tube forming apparatus, two mandrels, means for feeding a continuous sheet towards the mandrels, means for cutting the sheet into successive lengths, means for guiding the lengths alternately to the two mandrels, and means to rotate the mandrels comprising means to start one mandrel and gradually accelerate it to synchronous speed with the other mandrel in timed relation to receive the on-coming end of a length as the final end of the preceding length reaches the other mandrel.

27. In tube forming apparatus, two mandrels, angular in cross-section, means for feeding a series of lengths of sheet material alternately to the mandrels, and means for rotating the mandrels comprising means for gradually accelerating each mandrel to a predetermined speed, rotating the mandrel at said speed a predetermined number of times, gradually decelerating the mandrel, and stopping it in the same position from which it started.

28. In tube winding apparatus, a mandrel angular in cross section, means for feeding a length of sheet material to the mandrel, means for rotating the mandrel and winding the length thereon, and means for applying a strip of paste across the length once for each revolution of the mandrel, with the strips of paste slightly farther apart than the distance around the mandrel.

29. Apparatus for making bags, comprising a mandrel angular in cross-section, means for feeding a length of sheet material to the mandrel and wrapping it thereabout with one edge overhanging one end of the mandrel, means for slitting the overhanging edge in substantial registration with the corners of the mandrel, means to apply adhesive along the overhanging edge of the sheet and along each slit, and means to fold the flaps, formed by the slits, successively against the end of the mandrel.

30. In tube making apparatus, a mandrel angular in cross-section and comprising substantially parallel side plates and an end plate, means to move the side plates towards each other, creaser plates, means to move the creaser plates towards the sides of the side plates when said side plates are moved toward each other, means to move the end plate away from the side plates, and stripper rolls in position to receive the bag from said end plate.

31. In bag making apparatus, a mandrel, means to wind sheet material around the mandrel so one edge overhangs one end of the mandrel, means to fold said overhanging edge to form a closed end of the bag, means to fold in a portion of the other end of the bag to form a valve, and means to remove the bag thus formed from the mandrel.

32. Apparatus in accordance with claim 31 comprising means to withdraw one side of the mandrel from the path of the tucked-in valve during the removal of the bag from the mandrel.

33. Tube forming apparatus, comprising a mandrel angular in cross section and comprising two parallel plates and means to move the plates apart to expand the mandrel and towards each other to contract the mandrel, means to guide a length of material to the mandrel, means to rotate the mandrel and wind the length thereon to form a tube, said rotating means comprising means to stop the mandrel always in the same position, creasing plates in the plane between said parallel plates when the mandrel is in its stopping position, and means for moving the creasing plates towards the mandrel timed with the means for moving the parallel plates toward each other.

34. Tube forming apparatus, comprising a mandrel angular in cross section and comprising two parallel plates, means to move the plates apart to expand the mandrel and towards each other to contract the mandrel, means to guide a length of material to the mandrel, means to rotate the mandrel and wind the length thereon to form a tube, said rotating means comprising means to stop the mandrel always in the same position, creasing plates in the plane between said parallel plates when the mandrel is in its stopping position, and stripping rolls at the end of the mandrel in position to receive the collapsed tube and strip it from the mandrel.

35. Bag forming apparatus, comprising a mandrel angular in cross-section, means to rotate the mandrel and stop it always in the same position, means to feed a length of sheet material to the mandrel and wind it thereon with one edge overhanging the end of the mandrel, means to fold said overhanging end against the end of the mandrel and form a bottom for a bag, means to collapse the mandrel, means to crease the sides of the bag and form gusset folds simultaneously with the collapsing of the mandrel, means to move the bottom of the bag away from the mandrel and simultaneously crease the side of the bag parallel with the bottom, and means for stripping the bag from the mandrel and pressing it in collapsed form.

36. The method of making a bag, which comprises slitting the edge of a sheet of material and thereby forming flaps, applying adhesive to the edge of each flap between the slits, winding the sheet into tubular form, angular in cross section with the angles substantially registering with the slits, and folding the flaps between the slits successively across the end of the tube while winding the sheet into tubular form.

37. The method of forming a bag, which consists in slitting the edge of a sheet of material, creasing said edge longitudinally at substantially the ends of the slits thereby forming flaps outlined by the slits, the edge of the material, and the crease, applying adhesive to such flaps, winding the sheet into tubular form, and folding each flap in succession smoothly across the end of the tube to form a bag bottom.

38. The method of making a bag, comprising slitting the edge of a sheet and thereby forming flaps between the slits, winding the sheet into a tube angular in cross-section with the angles substantially registering with the slits, and folding the flaps of the sheet between the slits across the end of the tube to form a bag bottom.

39. The method of forming a bag, which consists in slitting the edge of the sheet, creasing the sheet longitudinally parallel with the edge and at about the ends of the slits, winding the sheet into a tube angular in cross-section with the angles substantially registering with the slits, and folding the flaps, outlined by the edge of the sheet, the slits and the crease, successively across the end of the tube to form a bag bottom.

40. The method of making a bag which consists in slitting the edge of a sheet of paper, winding the paper into a tube angular in cross section and with the angles substantially registering with the slits, applying a narrow strip of adhesive along each side of each slit and along the free edge of each flap divided off by the strips and thereby leaving the body of each flap free from paste, and folding each flap in succession smoothly across the end of the tube, adhering it to the next inner flap, and thereby forming a bag bottom.

HARRISON R. WILLIAMS.